US009123210B2

(12) United States Patent
Bennett et al.

(10) Patent No.: US 9,123,210 B2
(45) Date of Patent: Sep. 1, 2015

(54) GAMING METHOD AND SYSTEM HAVING ANIMATED CHARACTER FOR PLAYER INFORMATION DELIVERY

(71) Applicant: Aristocrat Technologies Australia Pty Limited, North Ryde, NSW (AU)

(72) Inventors: Nicholas Luke Bennett, Manly Vale (AU); Natalie Bryant, Rosebery (AU); Stephen Byng, Rosebery (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/784,151

(22) Filed: Mar. 4, 2013

(65) Prior Publication Data

US 2013/0244751 A1 Sep. 19, 2013

Related U.S. Application Data

(60) Continuation of application No. 12/508,346, filed on Jul. 23, 2009, now Pat. No. 8,408,989, which is a division of application No. 09/857,042, filed on Feb. 25, 2002, now Pat. No. 8,360,846.

(30) Foreign Application Priority Data

Nov. 26, 1998 (AU) ........................................ PP7341
Nov. 25, 1999 (AU) ........................ PCT/AU99/01059

(51) Int. Cl.
*G06F 17/00* (2006.01)
*G06F 19/00* (2011.01)
(Continued)

(52) U.S. Cl.
CPC ................ *G07F 17/34* (2013.01); *G07F 17/32* (2013.01); *G07F 17/3227* (2013.01)

(58) Field of Classification Search
CPC . G07F 17/32; G07F 17/3211; G07F 17/3213; G07F 17/322; G07F 17/3225; G07F 17/3244; G07F 17/326; G07F 17/3262; G07F 17/3265; G07F 17/3267; G07F 17/3272; G07F 17/3274; G07F 17/3276; G07F 17/34
USPC ....................... 463/16–20, 25, 29–31, 40–42; 273/138.1–143 R
See application file for complete search history.

(56) References Cited

U.S. PATENT DOCUMENTS 4,448,419 A 5/1984 Telnaes
4,508,345 A 4/1985 Okada
(Continued)

FOREIGN PATENT DOCUMENTS

AU 4361397 B 2/1998
AU 6371698 A 11/1998
(Continued)

OTHER PUBLICATIONS

International Search Report corresponding to International Application No. PCT/AU99/01059, 3 pages, mailed Jan. 6, 2000.
(Continued)

*Primary Examiner* — Milap Shah
(74) *Attorney, Agent, or Firm* — McAndrews, Held & Malloy, Ltd.

(57) ABSTRACT

A console is described, having display means, and game control means arranged to control images displayed on the display means, the game control means being arranged to play a game in which one or more symbols are randomly selected as a combination of symbols and displayed on the display means. If a winning combination results, the machine awards a prize. In some circumstances, the console will display an animated character to communicate information to the player. The character is independent of and appears asynchronously with respect to the game being played and is arranged to appear super imposed over any game screen currently displayed at the time the character is displayed.

27 Claims, 21 Drawing Sheets

(51) Int. Cl.
*G07F 17/34* (2006.01)
*G07F 17/32* (2006.01)

(56) References Cited

U.S. PATENT DOCUMENTS

| | | | | |
|---|---|---|---|---|
| 4,756,531 | A | 7/1988 | DiRe et al. | |
| 5,584,764 | A | 12/1996 | Inoue | |
| 5,655,961 | A | 8/1997 | Acres et al. | |
| 5,910,048 | A | 6/1999 | Feinberg | |
| 5,989,121 | A | 11/1999 | Sakamoto | |
| 6,012,982 | A | 1/2000 | Piechowiak et al. | |
| 6,089,976 | A | 7/2000 | Schneider et al. | |
| 6,142,874 | A | 11/2000 | Kodachi et al. | |
| 6,142,875 | A | 11/2000 | Kodachi et al. | |
| 6,146,273 | A | 11/2000 | Olsen | |
| 6,159,098 | A | 12/2000 | Slomiany et al. | |
| 6,174,233 | B1 | 1/2001 | Sunaga et al. | |
| 6,190,255 | B1 | 2/2001 | Thomas et al. | |
| 6,203,429 | B1 | 3/2001 | Demar et al. | |
| 6,270,411 | B1 | 8/2001 | Gura et al. | |
| 6,287,194 | B1 | 9/2001 | Okada et al. | |
| 6,364,765 | B1 | 4/2002 | Walker et al. | |
| 6,375,567 | B1 | 4/2002 | Acres | |
| 8,360,846 | B1 * | 1/2013 | Bennett et al. | 463/20 |
| 8,408,989 | B2 * | 4/2013 | Bennett et al. | 463/20 |
| 2001/0048193 | A1 | 12/2001 | Yoseloff et al. | |

FOREIGN PATENT DOCUMENTS

| | | | |
|---|---|---|---|
| AU | 7885398 | A | 2/1999 |
| EP | 159898 | A | 10/1985 |
| JP | 09047550 | A | 2/1997 |
| JP | 09056895 | A | 3/1997 |
| JP | 09056896 | A | 3/1997 |
| WO | 9910849 | A | 3/1999 |

OTHER PUBLICATIONS

Translation of JP 09047550A, Machine English Translation of abstract, detailed description, claims and description of drawings.

Translation of JP 09056895A, Machine English Translation of abstract, detailed description, claims and description of drawings.

Translation of JP 09056896A, Machine English Translation of abstract, detailed description, claims and description of drawings.

* cited by examiner

GAMING METHOD AND SYSTEM HAVING ANIMATED CHARACTER FOR PLAYER INFORMATION DELIVERY

RELATED APPLICATION

This application is a continuation of U.S. patent application Ser. No. 12/508,346 having a filing date of Jul. 23, 2009, now U.S. Pat. No. 8,408,989, which is a divisional application of U.S. patent application Ser. No. 09/857,042, now U.S. Pat. No. 8,360,846, having a filing date of Feb. 25, 2002, which is a National Application of International Application No. PCT/AU99101059 having an International filing date of Nov. 25, 1999, which claims priority to Australian Provisional Application No. PP7341 having a filing date of Nov. 26, 1998, all of which are incorporated herein by reference in their entirety.

BACKGROUND

The present invention relates to gaming consoles or gaming machines of the type known as slot machines arranged to play a large variety of card related and other gambling games and in particular the invention provides an improvement to a game played on such a machine or console.

Players who regularly play gaming machines quickly tire of particular games and therefore it is necessary for manufacturers of these machines to come up with innovative game features that add interest to the games provided on such machines in order to keep the players amused and therefore willing to continue playing the game.

DESCRIPTION OF THE PRIOR ART

Gaming or poker machines have been well known in some jurisdictions such as the state of New South Wales in Australia and Nevada in the United States for many years and more recently such machines have gained considerable popularity in a growing number of new jurisdictions with quite substantial amounts of money wagered on these machines. There is a growing tendency for State Governments to legalize the use of gaming machines by licensing operators, with resulting revenue gains through license fees and taxation of monies invested. The licensed operation of gaming machines is the subject of State legislation and regulation. This regulation most always dictates a minimum percentage payout for a gaining machine. For example, in New South Wales a minimum of 85% of monies invested must be returned as winnings, and manufacturers of gaming machines therefore must design their machines around these regulatory controls.

With the growth that has occurred in the gaming machine market there is intense competition between manufacturers to supply the various existing and new venues. When selecting a supplier of gaining machines, the operator of a venue will often pay close attention to the popularity of various games with their patrons. Therefore, gaming machine manufacturers are keen to devise games which are popular with players, as a mechanism for improving sales.

Many various strategies have been tried in the past to make games more enticing to players, including the commonly known double-up feature, whereby, if a player wins a particular game, they can then risk the winnings of that game in a double-or-nothing mode in which they gamble on a subsequent, and often different, game such as whether a red or black card will be the next card drawn.

Other techniques adopted in the past have been to provide complexity in the numbering and combinations of indicia which would result in a win, thereby hoping to convince the player that there is a greater chance of winning and to keep their interest in a particular game.

Throughout this specification and claims when the term "morph" is used, it is intended to indicate a transformation or metamorphosis from a current image or character to a new image or character.

SUMMARY OF THE INVENTION

According to a first aspect the present invention provides a gaming console having display means, and game control means arranged to control images displayed on the display means, the game control means being arranged to play a game wherein one or more random events are caused to be displayed on the display means and, if a predefined winning event or combination of events results, the machine awards a prize, the console being characterized in that an animated character is periodically displayed to communicate information to the player, the character being arranged to appear super imposed over any game screen currently displayed at the time the character is displayed, the character appearing to award a bonus prize awarded from a bonus prize pool and the character appearing to dispense or control the dispensing of the prize.

Preferably, in embodiments of the invention, a generic character, such as a coin with glasses, top hat, legs and arms will be used as the animated character (known as Mr. Cashman). The animated character is preferably used to indicate to the player any game and feature prizes won as a result of playing the respective game in addition to the bonus prizes.

Preferably also, the triggering of the appearance of the character being independent of the outcome of the current game.

In some embodiments, the character (i.e. Mr. Cashman) will occasionally randomly appear, entering the game screen, and awarding a variable random bonus prize. In preferred embodiments, the prize may be displayed in a number of ways such as by the character kicking the win meter, throwing coins at the win meter, pulling the prize out of his hat, picking up a digit and carrying it over to add in front of the win meter or similar.

According to a second aspect the present invention provides a gaming console having display means, and game control means arranged to control images displayed on the display means, the game control means being arranged to play a game bought by a player wherein after the player buys a game by committing a wager, one or more random events are caused to be displayed on the display means and, if a predefined winning event or combination of events results, the machine awards a prize, the console being characterized in that an animated character is periodically displayed to communicate information to the player, the character being arranged to appear super imposed over any game screen currently displayed at the time the character is displayed, the character appearing to award a bonus game or a bonus feature, where the bonus game or bonus feature has an outcome which is at least partially independent of the outcome of the current game bought buy the player.

In one embodiment, an animated spinning reel bonus game is provided in which the character (e.g. Mr. Cashman) causes one or more of a plurality of simulated reels to randomly spin. If more than one reel is spun, they will preferably be spun in random order. In different embodiments, the animation of the reel spinning may include the character kicking the reels, tapping them with his walking stick, pushing them, leaning on them, throwing an object at them etc. After the reels stop spinning, the player will be paid any wins that are associated with the symbol combination displayed on the stopped reels.

In another embodiment, a feature is provided in which the character offers a selection between two or more options with different offers of hidden prizes or bonus games being associated with each option such that when the player chooses one of the options the hidden offer associated with the selected option is revealed and awarded to the player. In one particularly preferred embodiment, a feature referred to as "The Money or the Box" is provided in which the character (i.e. Mr. Cashman) will be holding (for example) a bag of coins and a wad of dollar bills. This feature will be displayed as a second-screen feature after the end of the main game. The player will be asked to choose one or the other of the bag of coins or the wad of notes. If the bag is chosen, it will reveal that the player has been awarded a number of free games of the type offered as standard games on the console, and a multiplier will be applied to all prizes won during those free games. If the wad of bills is chosen, a variable prize will be determined from a range of possible prizes and will be revealed from the bills.

In a further embodiment of the invention, the character (i.e. Mr. Cashman) enters a game and randomly awards a game feature specific to the game being played. For example, the standard game may include a feature where the occurrence of three scatter symbols in a combination resulting from a bought game acts as a trigger event which causes the awarding of a plurality of free games (say 15) with all wins multiplied by a predetermined amount (e.g. tripled). In the preferred embodiment the character will enter the game and award the feature to the player without the need for the trigger event (such as the combination of three scatter symbols) that is normally the pre-requisite for the commencement of the feature.

In another embodiment the character (i.e. Mr. Cashman) will sometimes enter the game screen of an animated spinning reel game and while the reels are spinning as part of a bought game he will indicate one of the spinning reels to be treated as a bonus reel in this game. When the reels stop spinning, the indicated reel will be treated as having stopped on a wild symbol which substitutes for all symbols on that reel. In one embodiment of the invention the reel will be indicated by the character climbing into the foreground that reel. The visual effect will be that the reel is spinning behind the fixed image of the character. When the reels stop the character image in the foreground of the one of the reels will be treated as a wild symbol which substitutes for all symbols on that reel. In a further embodiment, the character enters the bought game after the reels have stopped spinning for that game and any prizes awarded and the character then commence all of the reels spinning again as a bonus game, and while they are spinning will indicate the reel to be treated as a bonus reel.

According to a third aspect the present invention provides a gaming console having display means, and game control means arranged to control images displayed on the display means, the game control means being arranged to play a game wherein one or more random events are caused to be displayed on the display means and, if a predefined winning event or combination of events results, the machine awards a prize, the console being characterized in that an animated character is periodically displayed to communicate information to the player, the character being arranged to appear super imposed over any game screen currently displayed at the time the character is displayed, and triggering of the appearance of the character being independent of the outcome of the current game.

In preferred embodiments, the trigger is random and weighted by the desired hit rate of the feature. It is preferably dependent upon the player's bet, and may or may not be dependent upon the size or type of the player's bet. For example, if a specific Mr. Cashman feature is required to be triggered to be initiated on average once in every 200 games played, then for every time the player initiates a game by pressing a bet button a random number will be selected in the range 1 to 200. If the number 1 is selected then the Mr. Cashman feature will be triggered. In some cases the chance of getting the Mr. Cashman feature will be dependent upon the number of lines played. For example, if for a single line bet the Mr. Cashman feature is required to occur on average once in every 1000 games, then ideally the range from which random numbers are selected would be 1 to (1000/lines played). From a practical point of view, the way this is implemented is to select a random number in the range 1 to 1000, and if the resulting number that is selected is in the range 1 to x, where x is the number of lines played then the Mr. Cashman feature will be triggered.

According to a fourth aspect the present invention provides a gaming console having display means, and game control means arranged to control images displayed on the display means, the game control means being arranged to play a game wherein one or more random events are caused to be displayed on the display means and, if a predefined winning event or combination of events results, the machine awards a prize, the console being characterized in that an animated character is periodically displayed to communicate information to the player, the character being arranged to appear super imposed over any game screen currently displayed at the time the character is displayed, and triggering of the appearance of the character being associated with a function or feature selected from a plurality of functions or features associated with the gaming console.

Preferably the selection of the function or feature from the plurality of functions or features is independent of the outcome of the current game.

Preferably also each different type of Mr. Cashman function or feature available in one game will have an independent, pre-determined probability of being triggered for each game played. In one embodiment of the invention there are 5 separate random selections which are made whenever a player makes a bet on game, relating to 5 separate functions or features. Any number from 0 to 5 of the selections may result in a successful triggering of a function or feature. In this embodiment, when a function or feature is triggered it will not commence until after the completion of the entire game in which the trigger occurred. However the function or feature will then commence before the player has been given the opportunity to bet on another game. In cases where more than one different function or feature is triggered from the same bet, the functions or features will commence one at a time such that as one completes the next one will commence. All of the triggered functions or features will complete before the player is given the opportunity to bet on another game.

In embodiments providing spinning reel games (i.e. video simulations of spinning reels) the actual bonus functions and/or features to be used will be as follows:

1. An animated spinning reel bonus game is provided in which the character (e.g. Mr. Cashman) causes one or more of a plurality of simulated reels to randomly spin. If more than one reel is spun, they will preferably be spun in random order. In different embodiments, the animation of the reel spinning may include the character kicking the reels, tapping them with his walking stick, pushing them, leaning on them, throwing an object at them etc. After the reels stop spinning, the player will be paid any wins that are associated with the symbol combination displayed on the stopped reels.

2. A bonus game feature is provided in which the character offers a selection between two or more options with different offers of hidden prizes or bonus games being associated with each option such that when the player chooses one of the options the hidden offer associated with the selected option is revealed and awarded to the player. In one particularly preferred embodiment, a feature referred to as "The Money or the Box" is provided in which the character (i.e. Mr. Cashman) will be holding (for example) a bag of coins and a wad of dollar bills. This feature will be displayed as a second screen feature after the end of the main game. The player will be asked to choose one or the other of the bag of coins or the wad of notes. If the bag is chosen, it will reveal that the player has been awarded a number of free games of the type offered as standard games on the console, and a multiplier will be applied to all prizes won during those free games. If the wad of bills is chosen, a variable prize will be determined from a range of possible prizes and will be revealed from the bills.

3. A bonus feature is provided in which the character (i.e. Mr. Cashman) enters a game and randomly awards a game feature specific to the game being played. For example, the standard game may include a feature where the occurrence of three scatter symbols in a combination resulting from a bought game normally causes the awarding of a series of 15 free games with all wins tripled. In the preferred embodiment the character will enter the game and award the feature to the player without the need for the combination of three scatter symbols that is normally the pre-requisite for the commencement of the feature.

4. A bonus feature is provided in which the character (i.e. Mr. Cashman) will occasionally randomly appear, entering the game screen, and awarding a variable random bonus prize. In preferred embodiments, the prize may be displayed in a number of ways such as by the character kicking the win meter, throwing coins at the win meter, pulling the prize out of his hat, picking up a digit and carrying it over to add in front of the win meter or similar.

5. A bonus game feature is provided in which the character (i.e. Mr. Cashman) will sometimes randomly enter the bought game, after the reels have stopped spinning and any prizes awarded for that game, and the character then commence all of the reels spinning again as a bonus game. While they are spinning the character will indicate a reel to be treated as a bonus reel in this game. When the reels stop spinning, the indicated reel will be treated as having stopped on a wild symbol which substitutes for all symbols on that reel. In one embodiment of the invention the reel will be indicated by the character climbing into the foreground that reel. The visual effect will be that the reel is spinning behind the fixed image of the character. When the reels stop the character image in the foreground of the one of the reels will be treated as a wild symbol which substitutes for all symbols on that reel.

According to a fifth aspect the present invention provides a gaming console having display means, and game control means arranged to control images displayed on the display means, the game control means being arranged to play a game wherein one or more random events are caused to be displayed on the display means and, if a predefined winning event or combination of events results, the machine awards a prize, the console being characterized in that an animated character is periodically displayed to communicate information to the player, the character being independent of and appearing asynchronously with respect to the game being played and arranged to appear super imposed over any game screen currently displayed at the time the character is displayed, the appearance of the character being accompanied by the provision of entertainment on the display and/or the sound output of the gaming console and continuation of the entertainment being conditional on the player contributing credits to the character, and the console adding the credits contributed to the character to a bonus pool.

In preferred embodiments the random event or events comprise one or more symbols being randomly selected as a combination of symbols and displayed on the display means and, if a winning combination results, the machine awards a prize.

In preferred embodiments, the character acts as a busker. Players will actually be able to make contributions or donations to the character in order to watch him busking. All of the money that the gaming console receives for the character's busking will be paid back to the player in bonus wins during the main game.

In the preferred embodiment, the character will appear on the screen when the machine is in a state of zero credit (zero credit mode). The character will adopt a busking pose such as by holding a musical instrument with his hat out in front of him. If a coin is inserted, the player will be given a choice of whether to play the game or watch the character busking. If the choice is to watch the character busking, he or she will perform for the player's money along with a special tune. Alternatively the character may cause some other form of entertainment to be provided such as introducing another character or causing a special graphic sequence or video to run. The coin that was inserted will be added into a bonus pool by the gaming console software.

In gaming consoles according to a preferred embodiment of the invention, during the main game, a random decision will be made as to whether the contents of the bonus pool (or a subset of the bonus pool) will be awarded in addition to any win from that feature. The software will always keep a running tally of the contents of the bonus pool.

According to a sixth aspect the present invention provides a gaming console having display means, and game control means arranged to control images displayed on the display means, the game control means being arranged to play a game wherein one or more symbols are randomly selected as a combination of symbols and displayed on the display means and, if a winning combination results, the machine awards a prize, the console being characterized in that an animated character is periodically displayed to communicate information to the player, the character being independent of and appearing asynchronously with respect to the game being played and arranged to appear super imposed over any game screen currently displayed at the time the character is displayed.

According to a seventh aspect the present invention provides a gaming console having display means, and game control means arranged to control images displayed on the display means, the game control means being arranged to play a game wherein one or more symbols are randomly selected as a combination of symbols and displayed on the display means and, if a winning combination results, the machine awards a prize, the console being characterized in that an auxiliary display means is provided, and an animated character is periodically displayed on the auxiliary display means to communicate information to the player, the character being independent of and appearing asynchronously with respect to the game being played and arranged to appear super imposed over any other information currently displayed on the auxiliary display at the time the character is displayed.

In embodiments in which the character is displayed on a second screen, there may also be interaction between the character and the main game when, for example, awarding bonuses, and in particular, the character may move to the main game screen to perform an action such as kicking the reels of a spinning reel game to award a bonus.

According to an eighth aspect, the present invention provides a gaining console having display means, and game control means arranged to control images displayed on the display means, the game control means being arranged to play a game wherein one or more symbols are randomly selected as a combination of symbols and displayed on the display means and, if a winning combination results, the machine awards a prize, the console characterized in that a player console interface is provided which operates asynchronously with the game to provide information to the player independently of the game.

According to a ninth aspect, the present invention provides a gaming console having display means, and game control means arranged to control images displayed on the display means, the game control means being arranged to play a game wherein one or more symbols are randomly selected as a combination of symbols and displayed on the display means and, if a winning combination results, the machine awards a prize, the console characterized in that a player console interface is provided that operates asynchronously with the game to provide winning opportunities in addition to those provided by the main game.

According to a tenth aspect, the present invention provides a gaming console having display means, and game control means arranged to control images displayed on the display means, the game control means being arranged to play a game wherein a random event is displayed and if the random event matches a predetermined event, a prize is awarded, the console being characterized in that a user interface control means is provided which operates functionally independently of the game control means, the user interface means including:

a) a monitoring mode in which it is substantially inactive while it waits for a trigger condition to cause it to transform to another mode,
b) an active mode in which it communicates information to the player regarding a current game being played or a system feature or function.
c) In various embodiments of the invention, a character is used to communicate information to the player and the character may take a variety of forms including:
d) an animated amorphous or "blob" like character,
e) an animated character taking the form of a normally inanimate object such as a coin, note or betting chip, a slot machine console, a video screen, etc.
f) an animated character in the form of a person or animal, or the head of a person or animal. In the case of an animated person, the character can be a caricature of a well known personality such as a celebrity of the establishment in which the console is installed.

The character will preferably be associated with an audio output which may include music and other sound effects to draw attention to the presence of the character, as well as voice output to communicate messages to the player.

The character preferably also delivers visual messages in the form of symbols and/or text with text being displayed for example, in a bubble 5 emitting from the mouth of the character.

Preferably, the animated character and any associated voice output are not gender identifiable.

The triggering of the character to appear is preferably achieved by any one or more of the following events:

a) a periodic trigger;
b) a random trigger;
c) the occurrence of an external trigger event;
d) the occurrence of one or more specific game states;
e) the occurrence of one or more specific console states;
f) a specific operator activity;
g) a specific player activity.

Examples of character triggers are:

a) the occurrence of a game state where the player must make a decision where the character may appear, to offer advice on probabilities of various possible outcomes, this trigger may be automatic or prompted by the player pressing a button;
b) the offering of bonus prizes as incentives to players who have had long non-winning stretches;
c) the offering game specific bonus features to players who have had a long stretch where the game specific bonus feature has not been awarded;
d) announcing a bonus game or a series of games awarded to the player;
e) announcing the winning of a mystery jackpot, either on the winning console, or a console adjacent the winning console;
f) providing wins in "near-miss situations by "nudging" a symbol into a winning position;
g) suggesting the ordering of a taxi for a player who has been observed to have been present for a long period (by way of a player trading system) or whose play is erratic and may indicate intoxication;
h) periodically offer drink or food ordering services; or
i) periodically provide public service information and information on services, facilities and entertainment programs offered to patrons;
j) advising a player when the console had detected a fault condition in which case the interface character will explain the fault to the player.

Bonuses may be provided by incrementing the win meter, for example, by the character walking up and kicking the win meter or hitting it with a sledge hammer, or may offer the player a choice of options the current selection of which may lead to a bonus prize being offered.

The character may also signal the size of a linked jackpot prize or the 10 current probability of a linked jackpot occurring in the case of some linked jackpot triggers.

In some embodiments of the invention, the player interface character changes, or its activity changes depending upon the activity of the player indicated, for example, by the rate of game play or the rate of credits bet. Alternatively, changes in the character or its activity are responsive to prize rates achieved, while playing the game.

In particular embodiments, a range of player interface characters are made available to the player of the console, such that the player may choose a character from the available range. The different characters made available will have differing characteristics and personalities and the player may choose the characters to which they relate to best. Alternatively, the selection of the player interface character may be an operator function which is selected in a setup mode or audit mode of the console or centrally selected using system functions.

In one preferred embodiment of the invention, the player interface character is displayed on a secondary display where the character spins a chocolate wheel at the same time as a main game is being played. The chocolate wheel may reveal a progressive jackpot trigger or another bonus condition.

The character may in some embodiments, appear on a bank of consoles in a coordinated manner to perform system functions in which case, the character may either appear simultaneously on all of the consoles in a bank or alternatively the character may only appear on one of the consoles in the bank at any one time. In one embodiment, the player interface character is animated to walk from one console to the next, disappearing from one screen as it appears on the next, such that it may duplicate the function of a club employee patrolling the bank of consoles and offering bonuses or providing other services. This feature can be used to advise players in the vicinity of a winning player when a major jackpot or progressive jackpot has been won. The players on other consoles in a bank can also be advised when the character appears on one of the consoles in the bank.

Tournaments can also be initiated by a player interface character appearing on each console eligible for the tournament to instruct or advise the players of those consoles. Alternatively, a tournament may also be triggered by other mechanisms and the winner is awarded a bonus by the character.

Player Interface

In linked systems, the player interface character may also be initiated manually by a system operator or administrator, in which case, a player interface character might by initiated when for example, the club operator notices a player becoming disgruntled and planning to leave the club, or at least the gaming area.

In some embodiments, it is necessary for the player to pay to gain access to the player interface system and to therefore benefit from the appearance of the player interface character.

BRIEF DESCRIPTION OF THE DRAWINGS

Embodiments of the invention will now be described by way of example with reference to the accompanying drawings in which.

Figure 18:
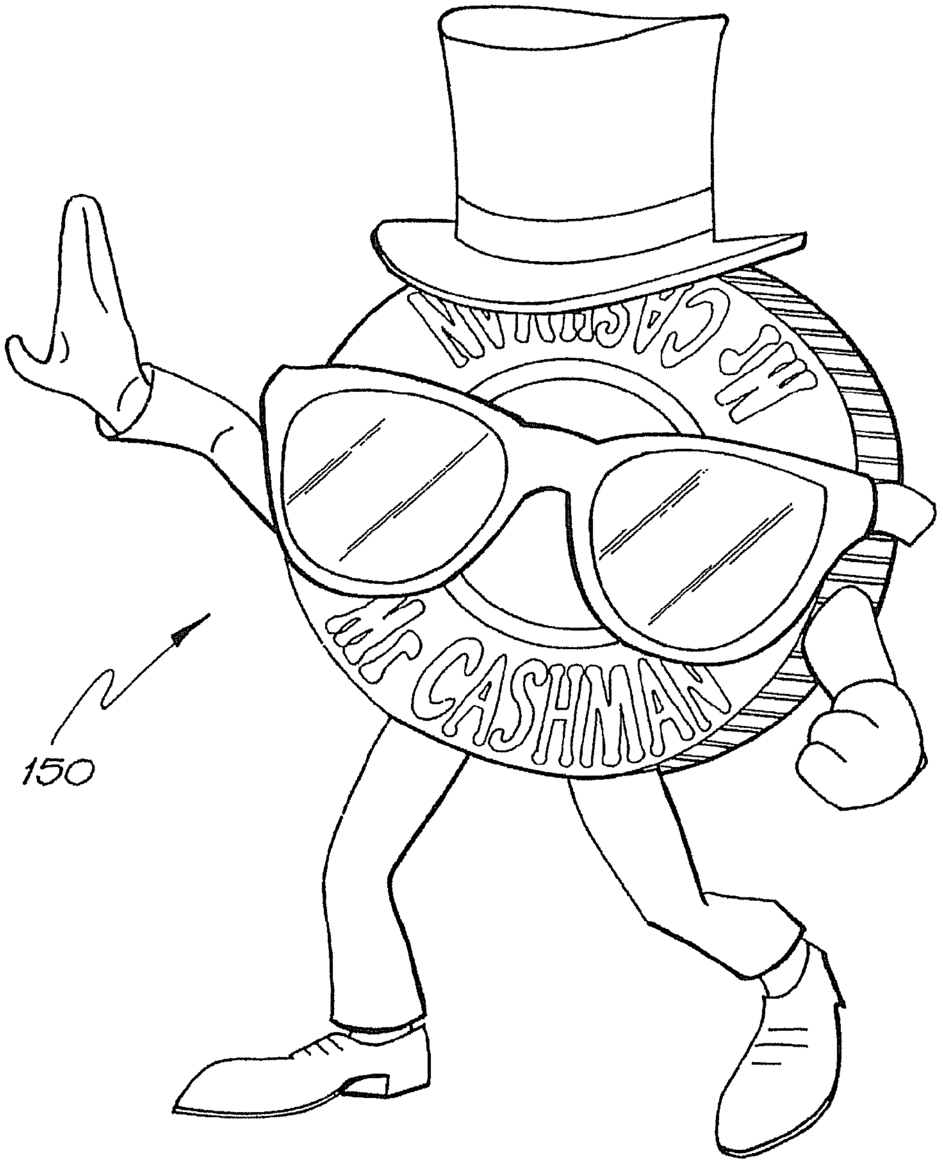
FIG. 18 is a further example of a character that may be used in embodiments of the invention.
Figure 19A:
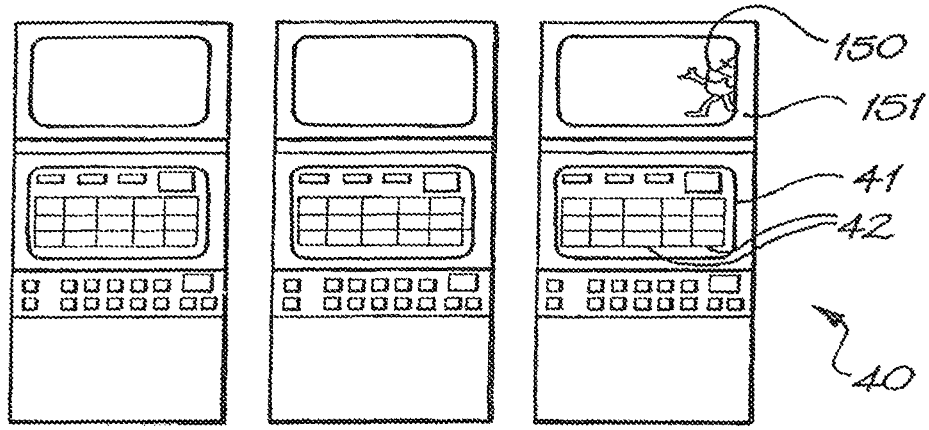
FIGS. 19A-19D illustrate 4 snapshots from a sequence where the character of FIG. 18 walks from screen to screen across the top box screens of a bank of 3 linked gaming machines.
Figure 19B:
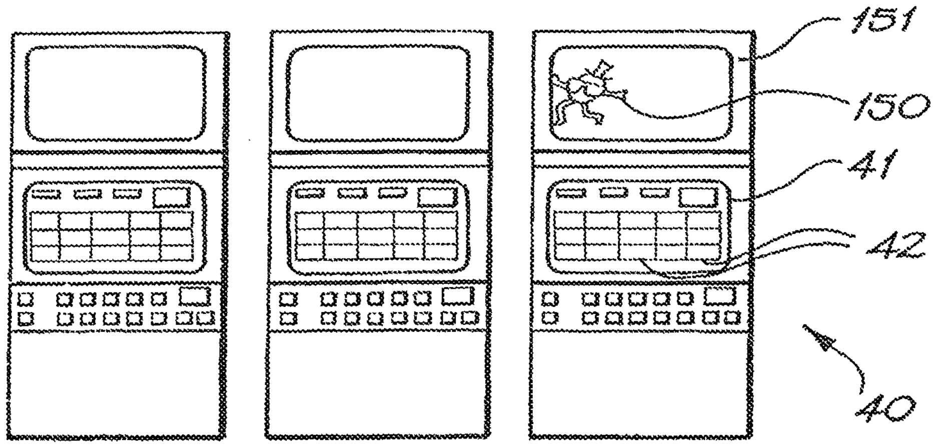
Figure 19C:
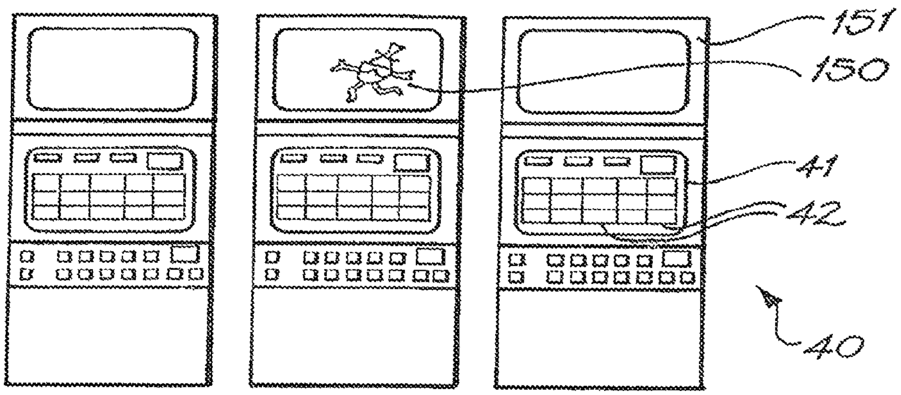
Figure 19D:
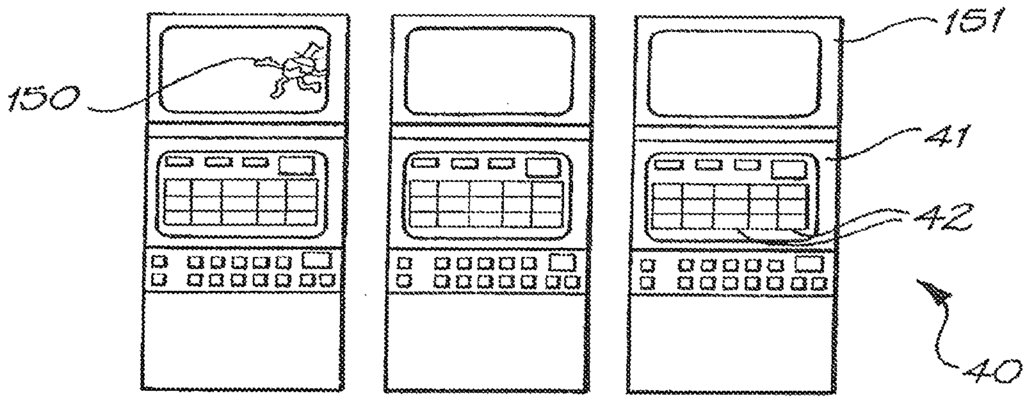
Figure 28A:
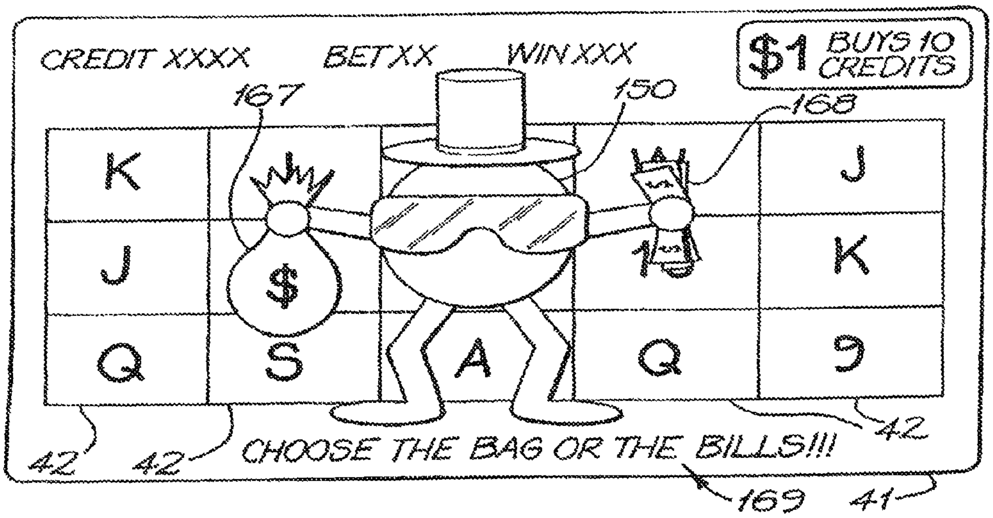
Figure 28B:
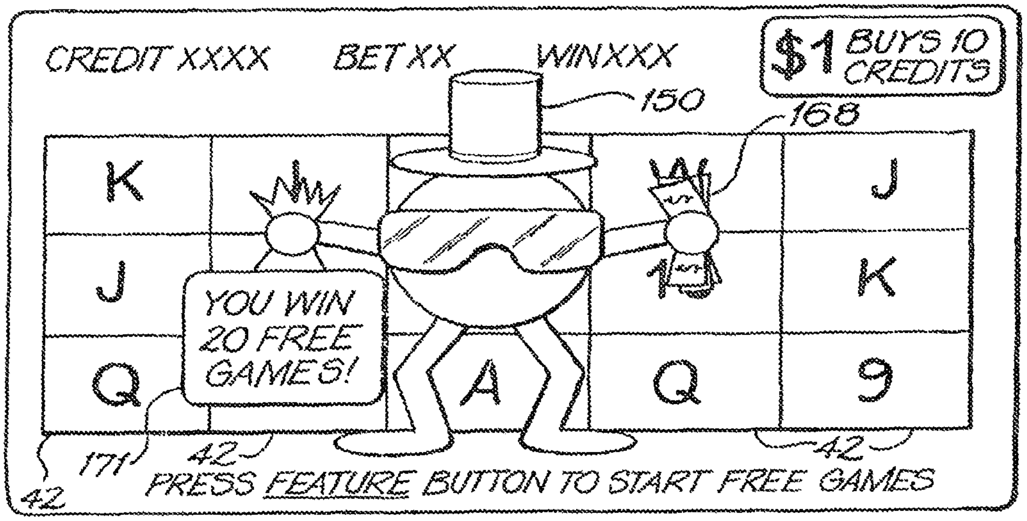
Figure 28C:
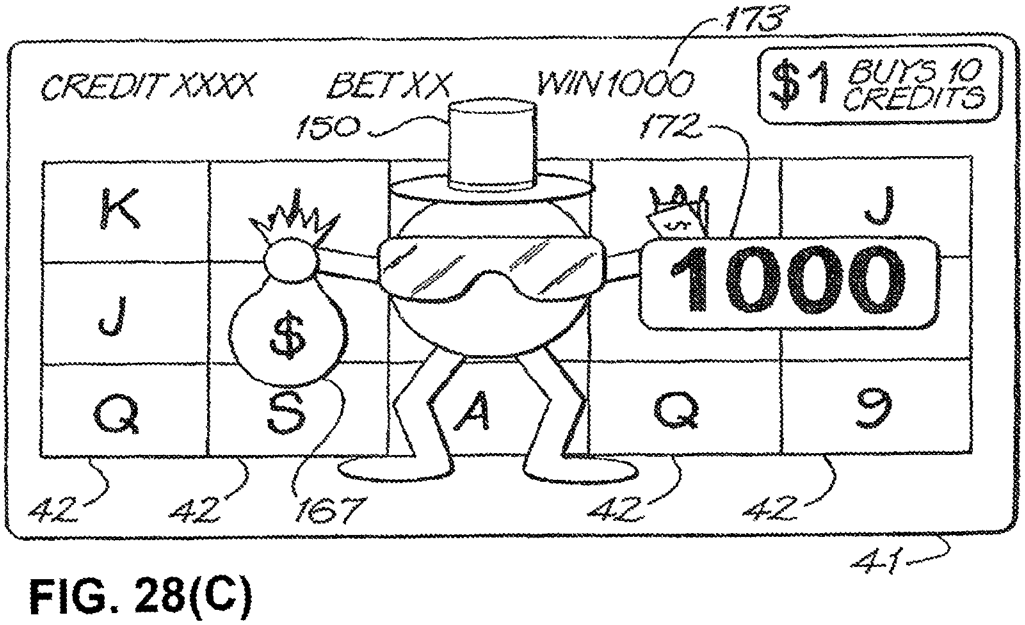

a) losing streak bonus;

b) the character of FIG. 18 randomly awarding a standard game feature; and c) displaying a message in a speech bubble; and FIGS. 28A-28C illustrate the character of FIG. 18 offering a "money or the box" feature.

DETAILED DESCRIPTION OF THE PREFERRED EMBODIMENTS

In the following detailed description the methodology of the embodiments will be described, and it is to be understood that it is within the capabilities of the non-inventive worker in the art to introduce the methodology on any standard microprocessor-based gaming machine or gaming console by means of appropriate programming.

Figure 1:
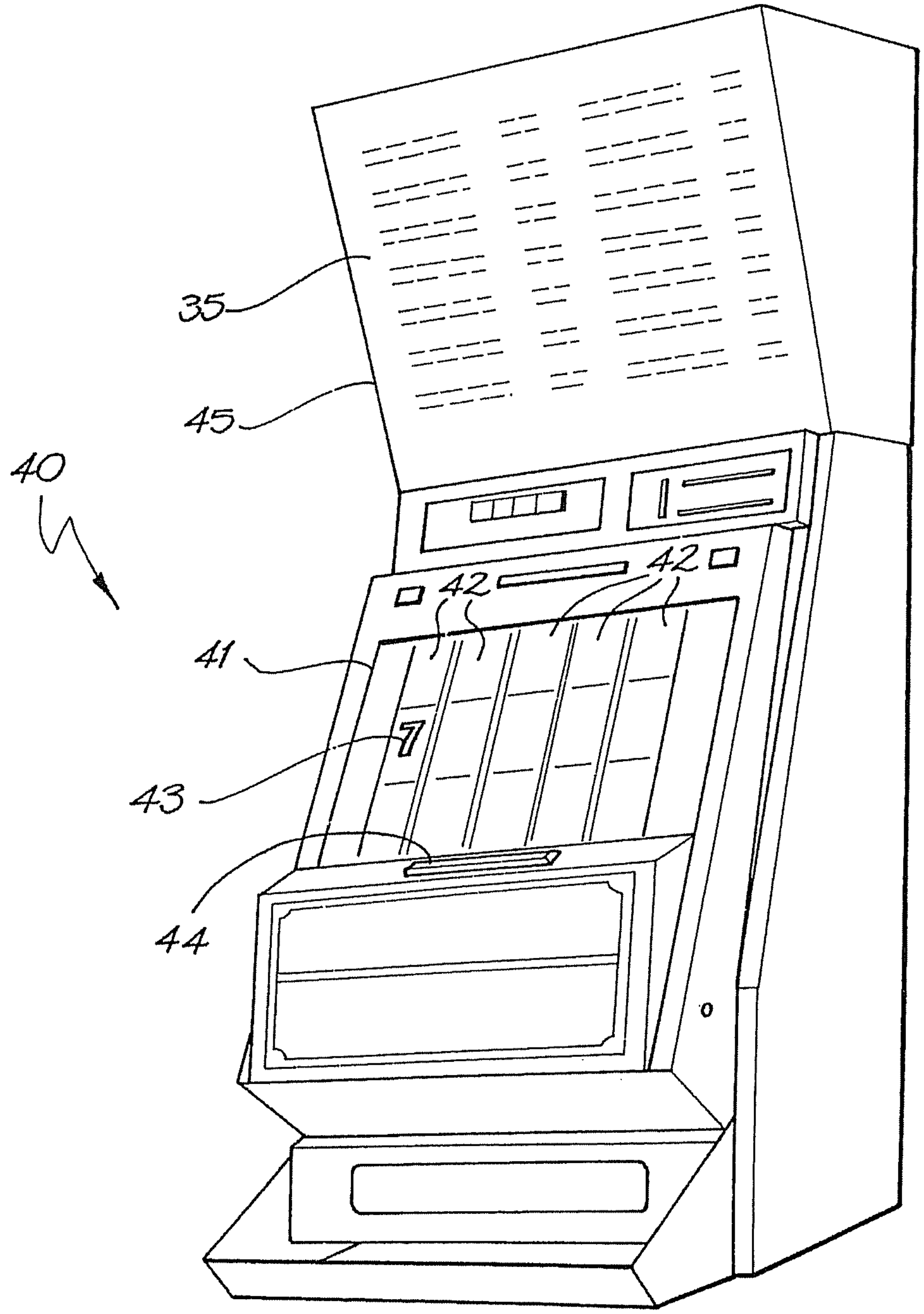
FIG. 1 illustrates a gaming machine with a video simulation of a rotating reel display incorporating a first embodiment of the invention.

Referring to FIG. 1 of the drawings, the first embodiment of the invention is illustrated in which a slot machine 40, of the type having a video display screen 41 which displays a plurality of rotatable reels 42 carrying symbols 43, is arranged to pay a prize on the occurrence of a predetermined symbol or combination of symbols.

In the slot machine 40 illustrated in FIG. 1, the game is initiated by a push button 44, however, it will be recognized by persons skilled in the art that this operating mechanism might be replaced by a pull handle or other type of actuator in other embodiments of the invention. The top box 45 on top of the slot machine 40 carries the artwork panel 35 which displays the various winning combinations for which a prize is paid on this machine.

Figure 2:
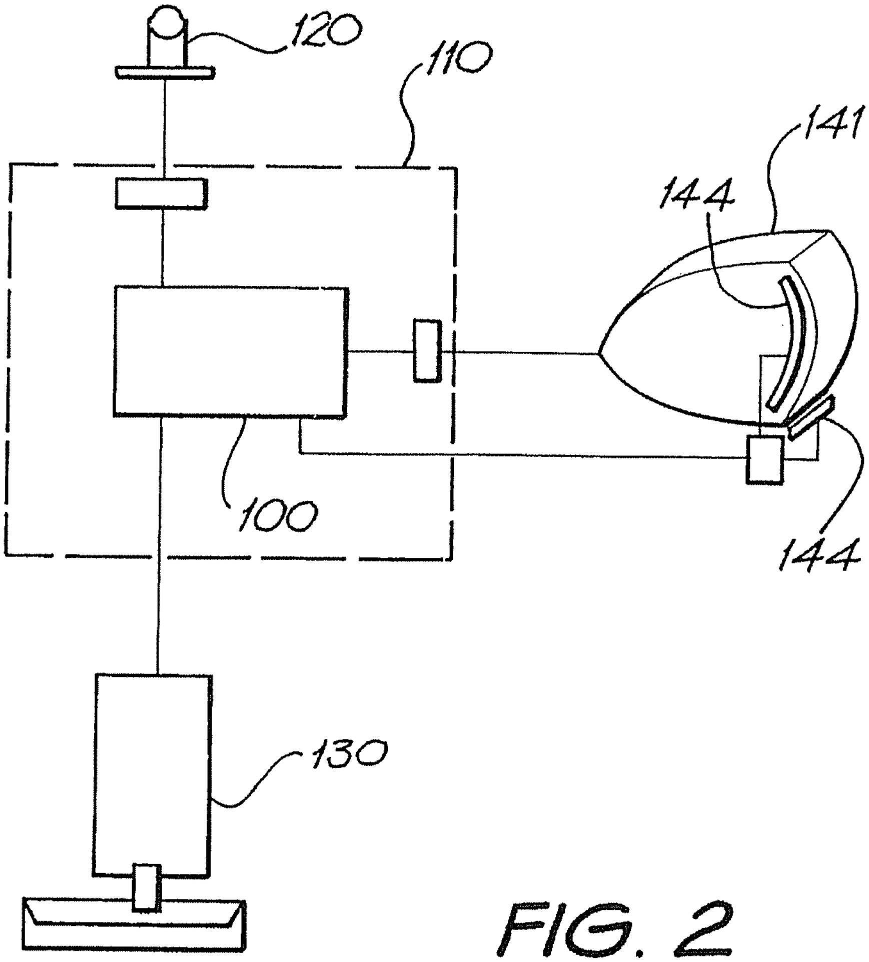
FIG. 2 is a schematic diagram of a slot machine control circuit.

The program which implements the game and user interface is run on a standard gaming machine control processor 100 as illustrated schematically in FIG. 2. This processor forms part of a controller 110 which drives the video display screen 141 and receives input signals from sensors 144. The sensors 144 may be touch sensors, however, in alternative embodiments these may be replaced by a pull handle or another type of actuator. The controller 110 also receives input pulses from a mechanism 120 indicating the user has provided sufficient credit to begin playing. The mechanism 120 may be a coin input chute, a credit card reader, or other type of validation device. The controller 120 also drives a payout mechanism 130 which for example may be a coin output.

The game played on the machine shown in FIGS. 1 and 2 is a relatively standard game which includes a 3 by 5 symbol display and allows multiple pay lines.

Slot machines such as those of the type described with reference to FIGS. 1 and 2 can be adapted to embody the present invention with generally only a software change to modify the functions of some of the user interfaces of the machine.

The system embodying the present invention has an animated graphic user interface in which an animated character or symbol supplies information through visual and audio mediums.

The animated character or symbol is preferably non-gender identifiable. The character is preferably capable of attracting the players' attention and when verbal interaction is provided preferably this is also non-gender identifiable.

The system is implemented as a separate process to the primary game and acts independently of the normal functions of the Machine.

The system monitors various functions, and states of the machine, game and players account and account history. The system will have a number of modes or states.

A mode or state may be activated through:

1) Random methods;
2) Triggered by game state;
3) Triggered by Machine State.

The 4 basic Modes of operation are:

1) Entertainment (comic character does comical things)
2) Information (messaging etc.):
3) Help (Character gives help information when requested. In this mode he/she can talk, point and demonstrate)
4) Payment (Pays a special prize either independently of any game being played, or as a bonus in the current game or one of the following games, or a series of special bonus games may be initiated).

The "Pay" mode is further divisible into one of a series of money distribution modes:

(i) Pick a box in which a player is offered a choice of a series of items or boxes and picks one to reveal a bonus prize.

Figure 4:
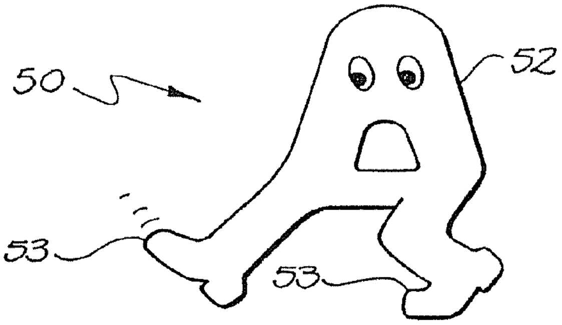
FIGS. 4 and 5 illustrate variations of the "A" character of FIG. 4 after "morphing"
Figure 5:
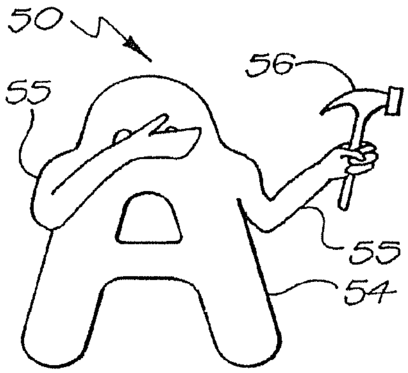
Figure 8:
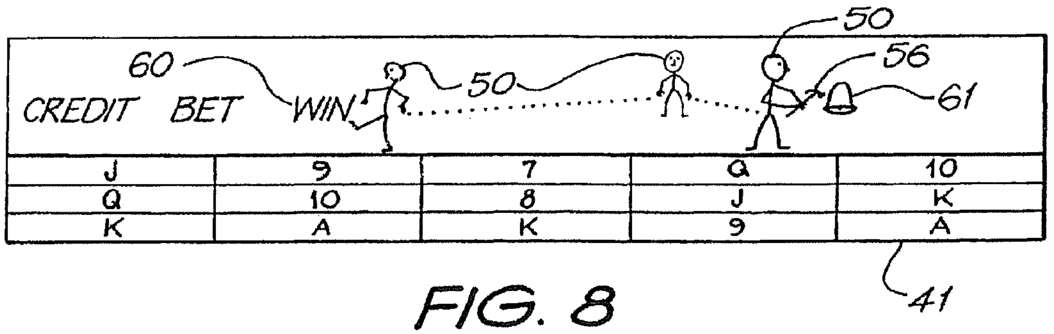
FIG. 8 is a schematic illustration of a game display during a random bonus mode.

(ii) Kick the win meter in which the character appears after occurrence of the trigger as illustrated in FIG. 8 and morphs into the character of FIG. 4 or 5 for example and then walks over to the win meter and kicks or hits it with a sledge hammer.

Figure 6:
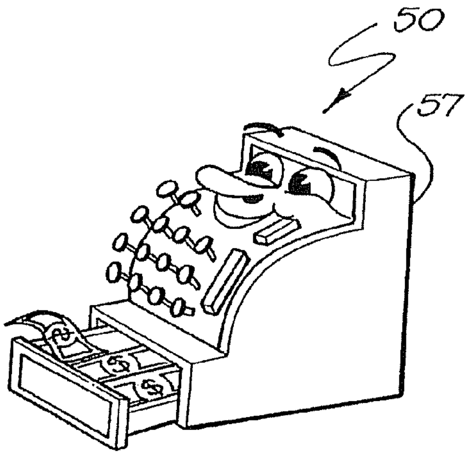
FIG. 6 is a cash register character which will be used in some functions associated with the invention.

(iii) Pay the looser in which a bonus is paid (say 50 credits) when the player has had a long losing streak (say 7 straight games) and the "A" character morphs into the cash register of FIG. 6, for example, and pays a bonus prize or alternatively, if the player has not achieved a trigger condition for a bonus game (e.g. 3 or more scatter symbols) the "A" character peels symbols away to reveal replacement symbols underneath which create the trigger condition. In a variation on this, the interface character could jump onto or punch through a stationary symbol and morph into a substitute, scatter or feature trigger symbol. The character may remain in the symbol location as the special symbol for a fixed or random number of games or length of time.

(iv) Award a bonus game where the player interface character walks up to reels and spins them (or deals cards in a card game, or drops balls in a ball game such as Pachinko or Keno). In the event that the spin etc. results in a winning combination, the prize from the standard pay table is awarded.

(v) Offer a side bet such as "I bet 100 credits you can't get 3 Jacks in the next 3 games" requiring the player to accept or reject the bet.

(vi) Offer a bonus conditional on future game results such as "I will give you 100 credits if you can get 3 Jacks in the next 3 games".

(vii) Herald a mystery in which a character appears or possibly morphs into another character and creates an atmosphere of celebrations.

Figure 9:
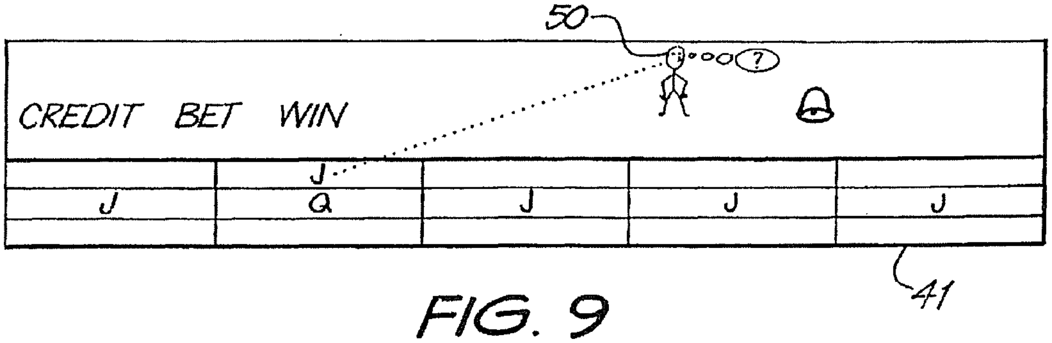
FIG. 9 is a schematic illustration of a game display in a near miss situation.
Figure 10:
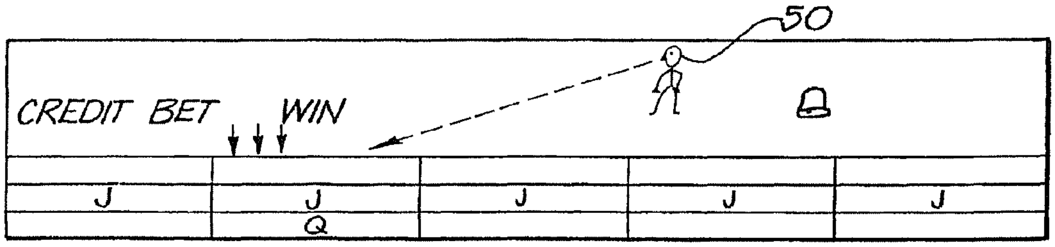
FIG. 10 is a schematic illustration of a game display during a nudging bonus mode in which the near miss situation of FIG. 9 is converted to a winning combination.

(viii) Nudge a reel in which, as illustrated in FIGS. 9 and 10, the character appears in a near miss situation (as in FIG. 9) and walks over to a reel and repositions it to create a winning combination (as in FIG. 10).

Figure 11:
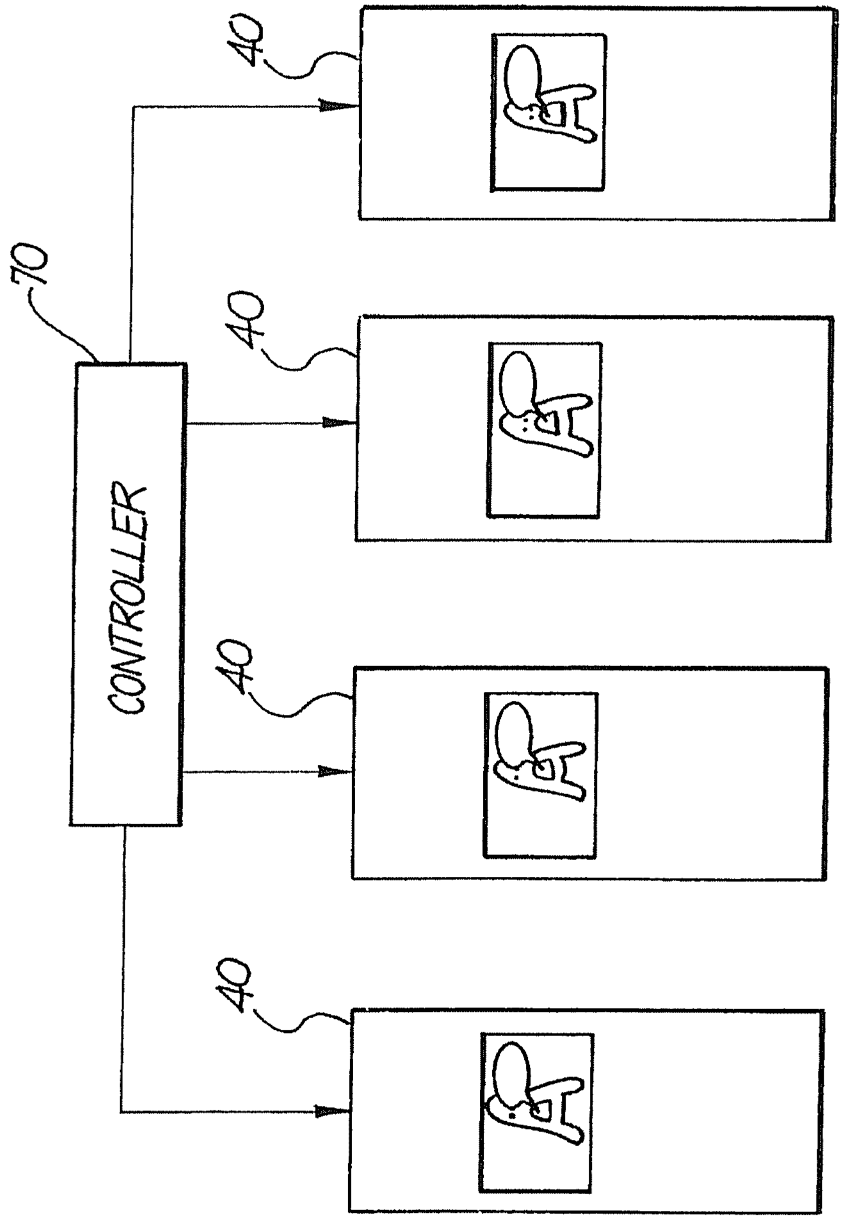
FIG. 11 is a schematic illustration of a plurality of machines linked to a network controller illustrating a networked user interface system.

In a systems environment as illustrated in FIG. 11, the central controller controls the actions of the user interface on each connected machine, allowing coordination of modes for adjacent machines. In this configuration, adjacent machines can be caused to display the results of a large win on a nearby machine, such as when a nearby machine wins a mystery jackpot. For example, fireworks might be displayed with a message that the mystery jackpot was just awarded to machine No "X". This message might only be displayed when a console is in attract mode or alternatively it might display on all machines within a certain radius at the end of the current game.

Other win display modes could use a character carrying a money bag and an animation of the character throwing notes and coins from the bag into the chip tray, or a money bag exploding to shower the display in money.

The player might also be awarded $2 to buy a consolation drink (or a drink voucher can be printed on machines with ticket printing facilities) when the player has lost a certain amount (say $50) and is out of credit. Other features of the player interface may include a player information mode which provides messages to assist the player such as message that:

a) indicate that the bill acceptor is broken, and not to put any money in until it is fixed;
b) indicates the current mystery jackpot amount and the range within which it must be won;
c) advises the players that there is a special feature in the game being played such as a second screen or gamble feature;
d) encourage the player to play a certain number of lines as a minimum so as to improve the chances of winning a feature;
e) explains wins and game features; and
f) tells players what buttons to press in a particular circumstance.

The interface while in the Information Mode, might also provide promotional messages such as:

a) advertisement for new games at the venue;
b) messages to attract players to vacant machines;
c) messages that advise the players about bonus points for turnover generated; and
d) messages that congratulate player of their birthdays (via information from a player registration system).

Player encouragement messages may also be included as part of the Information Mode such as messages that:

a) reinforce a near miss in a game by telling the player that one or more Ace would have wan them 100,000 credits;
b) advise the player to increase bet to have an improved chance of winning a jackpot;
c) encourage the player to bet on a maximum number of lines, for example, messages such as "If you had been betting on line 6, you would have just won 100 credits for 5 jacks";

d) encourage the player to repeat a previous action with a message such as “I bet you can’t do that again”; and e) tell the player why he has won, for example, 4× Jacks pays 1,000 credits.

When in the Entertainment mode, the interface will include actions such as celebrating wins, and the player interface may:

a) display dancing girls to celebrate big wins;

b) display flowers when a player looses;

c) the interface character (e.g. the “A” character of FIG. 3) may interact with game characters such as a Penguin. They may do a dance while the win meter increments;

d) the interface character may give appropriate winning messages; and e) a piece of jewelry worn by the interface character will glitter on 15 small wins.

While in the Entertainment Mode, the player interface character may interact with various parts of the game being played on the console. For example, the interface character may run around the scorecard, possibly even going so far as to modify or swap prizes/winning combinations around. It should be noted that changing prizes around could also be part of “payment” mode.

Other Entertainment Mode functions might include the interface character playing an instrument (such as a piano) or, conducting in time with winning tunes playing on the console when a win is achieved.

In the preferred embodiment, the character that forms the basis of the proposed user interface is an Amorphous symbol.

The symbol may then “morph” to form any symbols desired and form any appendage that is appropriate. This provides a very powerful degree of flexibility. By way of example, an amorphous representation of the letter “A” is illustrated in FIG. 3 and is illustrated superimposed on a console display in FIG. 4.

Figure 3:
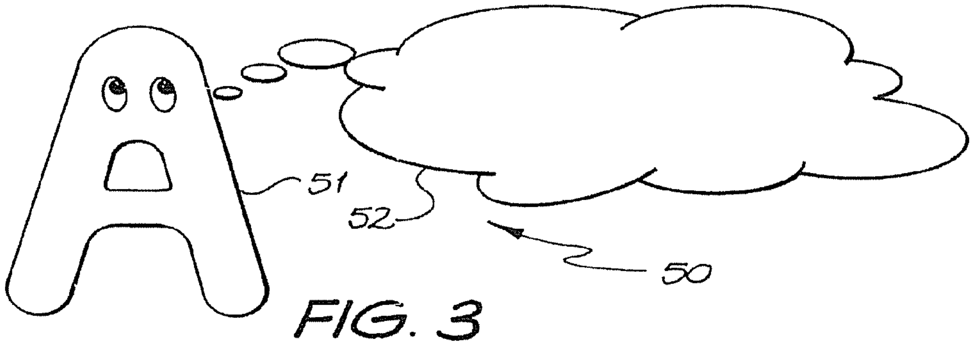
FIG. 3 illustrates an example of an amorphous "A" character, (with an optional thought bubble) used by the user interface system.
Figure 7:
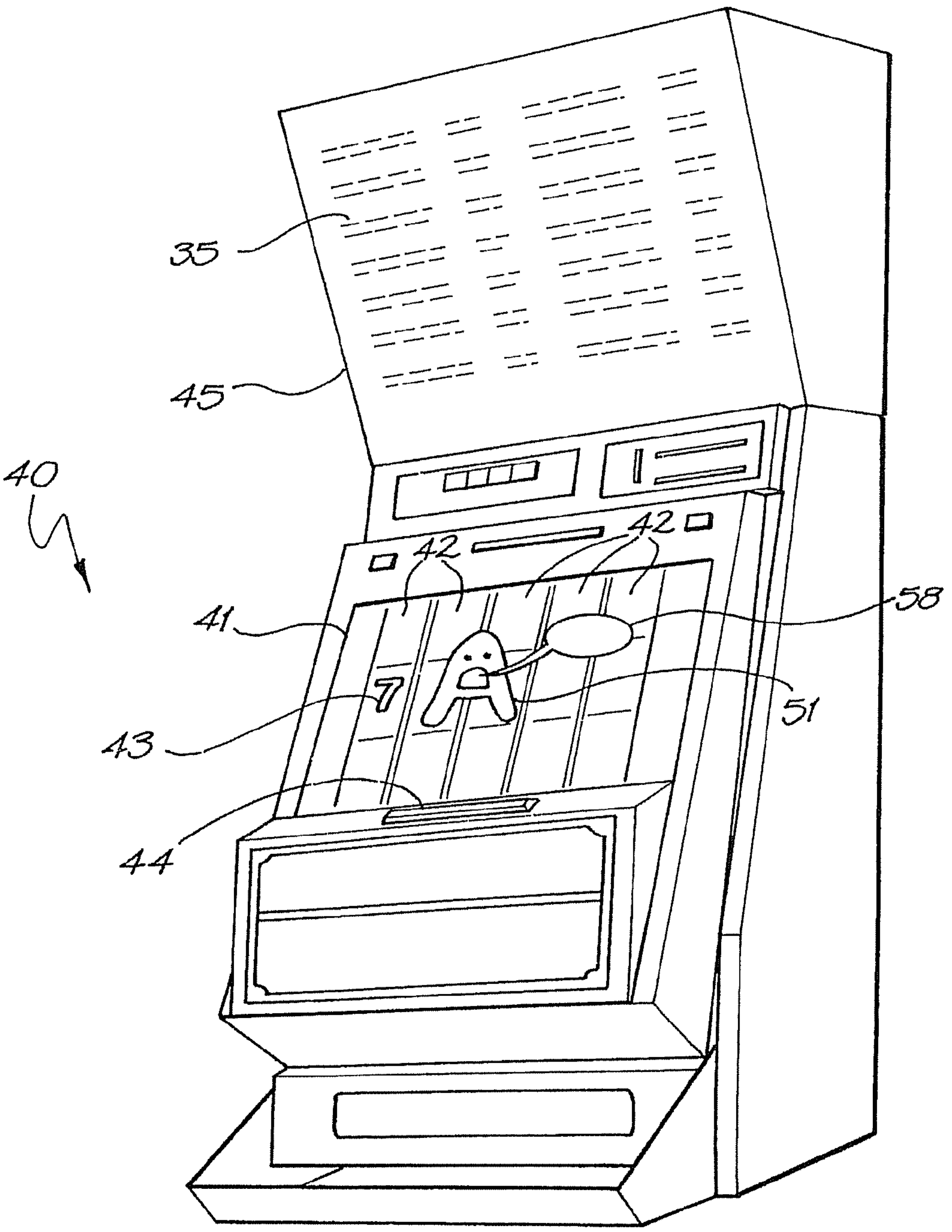
FIG. 7 illustrates the gaming machine of FIG. 1 with the character of FIG. 3 displayed together with a speech bubble.
Figure 27:
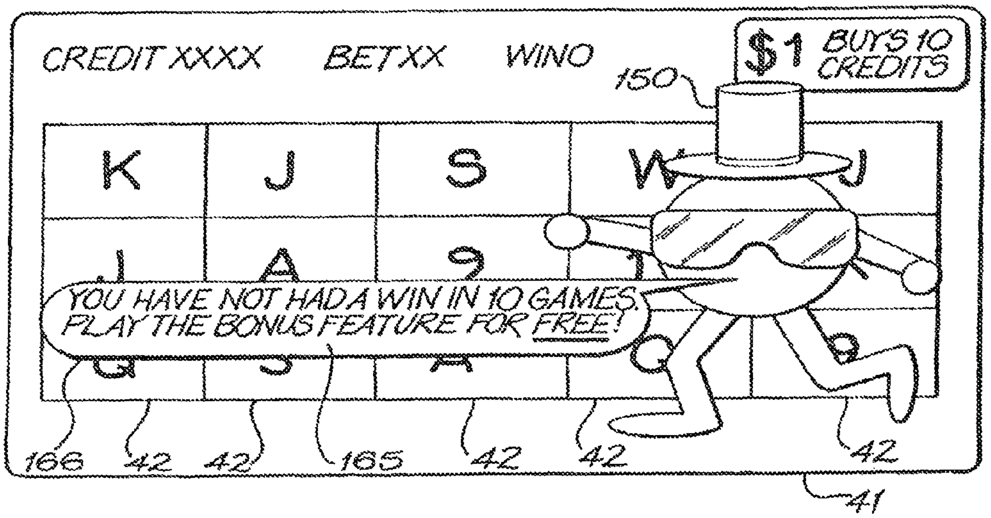
FIG. 27 illustrates 3 different features combined, these being.

As shown in FIGS. 3, 7 and 27. The cartoon thought or speech bubble, is immediately available and is a powerful interactive tool that need not be associated with sound. This may then “morph” into words or symbols. Some of the mechanisms that are possible are outlined below:

1) Starting out as the “A” symbol it can “morph” into a character based on the image of a Cash Register, with accompanying sound, when entering “award” or “pay” mode.

2) Starting out as the “A” symbol it can “morph” into a character 5 based on an Alarm Clock, with accompanying sound, when entering “award” or “pay” mode triggered by a random jackpot.

3) Suitable appendages may be formed on the “A” symbol to represent some of the functions a) A Magnifying Glass or bloodhound for Analysis mote.

b) A sledge hammer or boot when kicking or hitting the credit meter to provide a bonus.

4) Starting with the “A” symbol then stretching and spelling the words to represent different modes:

a) Aristocrat™;

b) Analysis;

c) Award;

d) Assistant;

e) Attendant;

f) Acquisition etc.

5) Any number of additional devices or symbols may be represented, providing flexibility for future game concepts that have not been conceived as yet.

In one embodiment, the character must be kept alive by the activities of the player. For example, the character may disappear or cease to function or slow in function if the rate of play slows below a preset threshold, such as 15 games per minute, or 100 credits per minute. This feature may also have progressive effects such that if the rate of play drops further (say less than 10 games per minute, or 60 credits per minute), functionality will reduce further and ultimately if the player activity drops to a critically low level (say less than 5 games per minute or 20 credits per minute), the feature may cease to function altogether. The manner in which the feature deteriorates in function and/or appearance will vary depending on the functions being provided at the time. For example, the feature may reduce the number of bonus feature games being awarded or may stop awarding feature games. If the appearance of the character deteriorates with reduced player activity, it may ultimately morph into a gravestone when the functions of the feature stop altogether. The deterioration of the character’s appearance may involve the character beginning to fade, or the character may become distorted or grotesque. The character may also exhibit a state of happiness when the rate of play is high and exhibit a sour expression when the rate of play is low.

In an alternative embodiment, the maintenance or deterioration of the character or its activity may be in response to the rate at which prizes are awarded in the game being played.

In one embodiment, the “A” symbol is provided with an ability to camouflage itself against any background. This would allow the symbol to blend in with the background when the symbol is not desired to be the object of focus. Providing an association with a chameleon like ability from its inception would allow the smooth blending of the symbol into any background. It would also associate the symbol with any colour, granularity or shading that similarly provides the flexibility for later implementations of, as yet, unconceived game concepts.

In one embodiment, the jackpot controllers are associated with a Rapid influx of money on the credit meter when a win is achieved. In such circumstances, the following events can be implemented:

a) The Cash Register may literally erupt with money. The final symbol could be any number of things.

b) A Tornado (of Money)

c) A waterfall (moneyfall), or d) Raining money along with stone clouds thunder and lightning. The flash of lightning and rumbling thunder, like “Thor”, would be 25 particularly attention grabbing.

e) Alternatively the morph could clap each time a player bets, perhaps slightly longer for a bet of maximum value. When the jackpot triggers, it starts to throw money (Don’t clap, throw money).

In another embodiment a symbol may be given the ability to morph into an alarm clock for any EGM function that is based on timing. The prime example for this is the Tournament game. The Tournament game is a function of the EGM that is particularly linked to time. The morphing character could be used to herald the end of a Tournament by morphing into a relevant object (alarm clock) and then issue the one-minute warning which might involve a spoken message.

In implementations of jackpot systems there are also a time related events. The final symbol could be any number of things associated with time:

a) Big Ben, b) An Hour Glass that shatters spilling money all over the place instead of sand.

In yet another embodiment a character may be given the ability to morph into one of the symbols of the game. This transformation could be triggered randomly. This then introduces an event, external to the pay table, being a variable of the "Return To Player".

Alternatively it could be triggered by a combination and hence handled like a second feature of the standard game.

In this embodiment, the morphing character may then represent:

a) The Substitute Symbol;
b) The Scatter Symbol;
c) The Feature Trigger Symbol;
d) The Free Spin Trigger Symbol.

It would then morph into one of the symbols of the game (such as a Tiger, a Cobra, or an Elephant in a game such as White Tiger™, etc.).

The morph would maintain this shape until the free game series or function was over. Hence while the free games are in effect, the morph would be moving (or slithering in the case of a snake) around the screen.

Rather than set off a set number of free games, the feature can be linked to the win meter or the player's bet. The player must win above a certain amount, or alternatively the number of free games can be a function of the players triggering bet or both.

In still another embodiment, the morphing character can form an appendage that looks like a Slot machine. The character plays the machine each time the player plays. If the character wins, then a low level pay sound is heard and the character then magnanimously donates its win to the player at which point it is credited to the player and a louder pay sound is now heard.

In one possible embodiment, the Morph's console will just bust to overflowing. This could be handled conceptually as a second game. In another embodiment, the system is proceeded with an "Analysis" mode, in which the character spells out the word Analysis to indicate the state that has now been entered. A log of the players' bets and wins may be analyzed where the character will Morph into a Gorilla, Ape or Monkey, walk over to the credit meter and apparently examine it. If the player has been on a particularly long losing streak, then Morph could pull out a peanut and break it open to "Award" or transfer some credit. The "thought bubble" feature can be used to indicate that Morph thinks that the player's credit was peanuts or that it was aware that the player had had a particularly long losing streak. The cycle is complete when Morph now spells out the "Award" message.

Any of the embodiments referred to above may be used in conjunction with another. Consider the combination of the character in the "second" and "fourth" embodiment in which the player could play a tournament against the character.

The control system of the present invention is preferably implemented as a State Machine.

The available states are defined as:

a) Amorphous Mode (The standard state of the machine from which it can transmute into another mode);
b) Analysis Mode (Initiated to investigate the current status of the internal operations of the machine);
c) Assistant Mode (A help function for the player);
d) Award Mode (Supplies the player with money as part of the combination, feature, jackpots or a special aid to a player on a losing streak):
e) Attendant Mode (An aid for the attendant—supplies accounting and auditing information).

Figure 12:
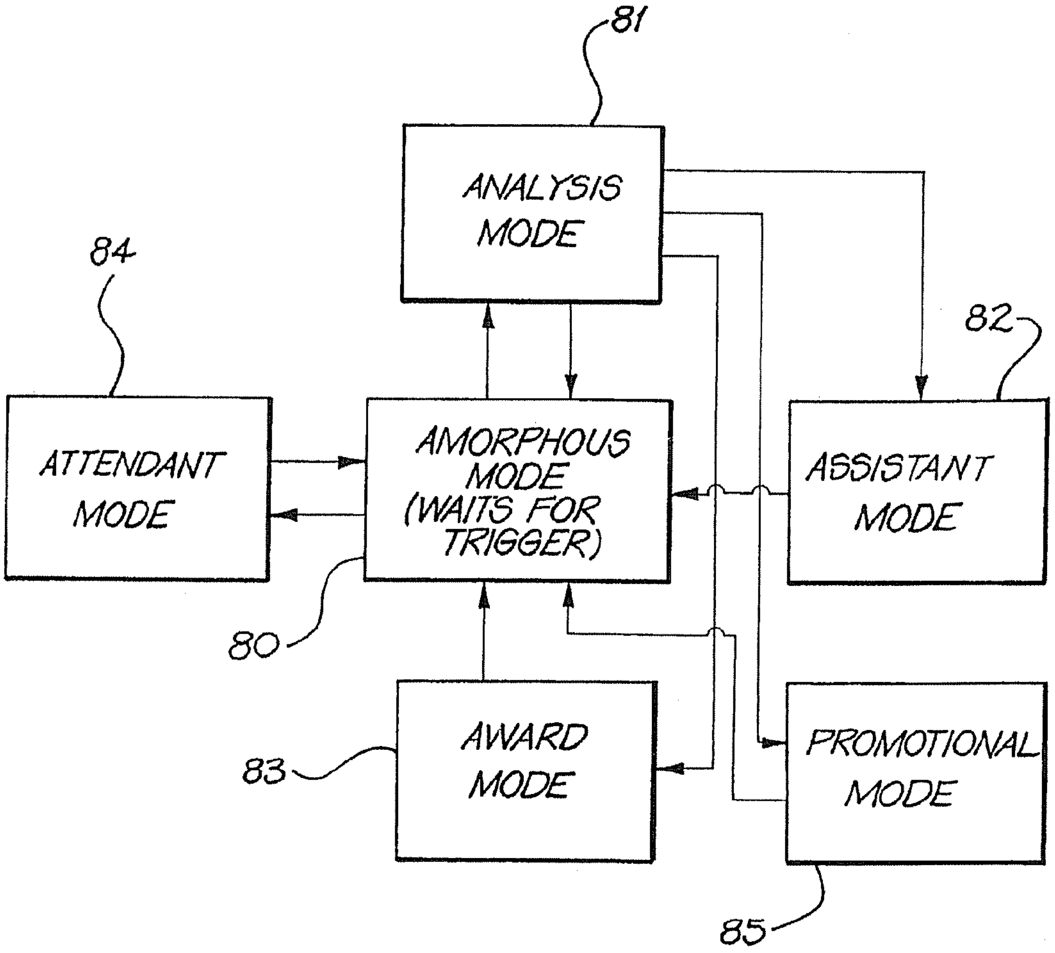
FIG. 12 is a state diagram of a state machine used to implement the player interface system.
Figure 13:
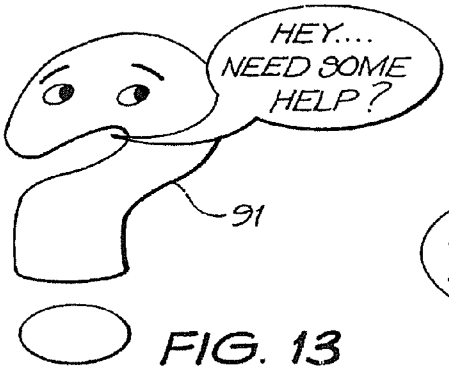
FIG. 13 is a help character in the shape of a question mark.
Figure 14:
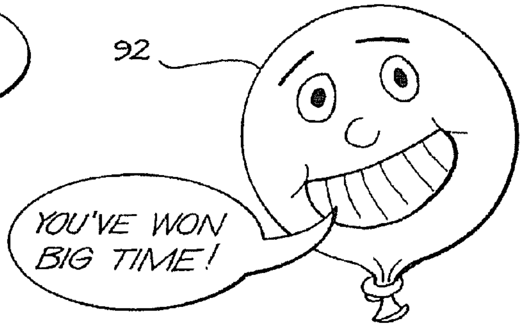
FIG. 14 is a balloon character used to advise the player of a win.
Figure 15:
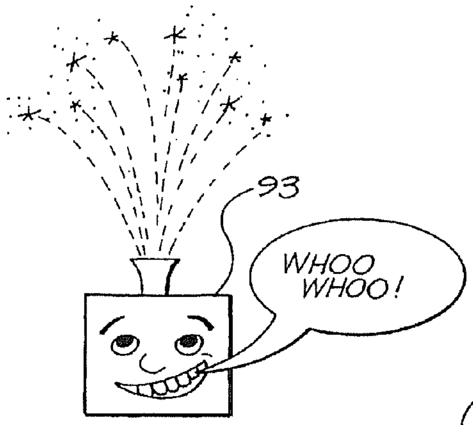
FIG. 15 is a fireworks display used to celebrate a large win.
Figure 16:
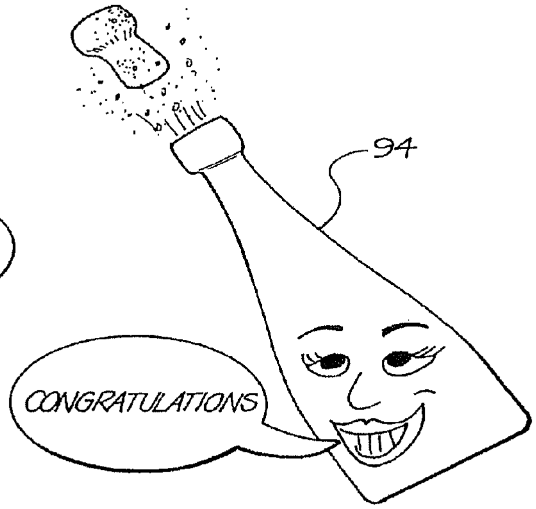
FIG. 16 is a champagne bottle used to celebrate a win.
Figure 17:
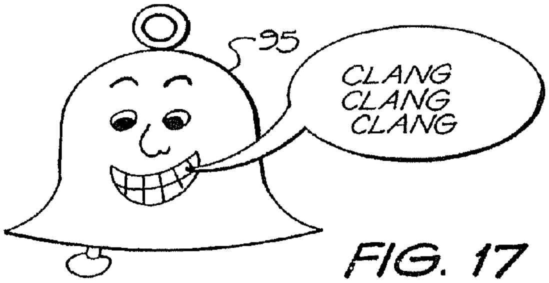
FIG. 17 is a bell character used to announce progressive jackpot wins.

Referring to FIG. 12, a state machine is illustrated in which the various states of the player interface are shown. The state machine is implemented as a separate program operating independently of and in parallel with the main game software running on the console. However the state machine has access to the status of the main game to determine various trigger conditions that trigger responses by the player interface.

The normal or rest state for the state machine is the amorphous state 80. This state is characterized by the interface character 50 either not being present or being present in the amorphous form 51 in a location that does not obstruct the operation of the main game. While in the amorphous mode, the state machine waits for external triggers such as signals from a progressive jackpot system. A random timer input is also provided which enables the state machine to trigger random actions such as random bonus payout or random bonus modes.

On a regular periodic basis, the state machine will undergo a transition from the Amorphous mode 80 to the Analysis mode 81 where it will conduct an analysis of the console status to determine if any actions are required based on the present status. Typical actions might be:

a) Player help—if the player is playing in an unusual manner of if the game status is at a player decision point and the player has delayed in making a decision, the player may require some help or explanation of game functions or features. The state machine should undergo a transition to Assistant mode 82;
b) Looser encouragement—if the player has experienced a losing streak of a predetermined length, the state machine should undergo a transition to Award mode 83;
c) Lost it all consolation—if the player has just lost their last credit and have lost more than a predetermined amount (say $50.00) in this session, the machine should undergo a transition to Award mode 83;
d) Play pattern modification—if the player is detected as playing slowly or betting in increments that do not optimize their chance of winning, the state machine will undergo a transition to Promotional mode 85;
e) Return to Amorphous mode—if none of the above, the state machine should undergo a transition back to Amorphous mode 80.

When the state machine is in Assistant mode the interface character 50 will morph into another suitable from such as a question mark and provide help to the player. The help provided, will depend on the situation. If there is a delay in the player making a selection, the character will offer an explanation of the choices, or if the player is experiencing some other difficulty such as pushing wrong buttons, the character will explain the "best" way of playing the game.

This mode might also offer suggestions on optimizing returns if the player is rejecting high return options or not maximizing their chances of progressive prizes. Once the advice has been offered, the state machine will return to Amorphous mode 80.

When in Award mode 83, the interface character will morph to a new character depending upon the type of award. If the award has resulted from a system wide progressive jackpot and triggered by a system input, the character may morph into a balloon, a sparkling firework display or a champagne bottle with popping cork to celebrate the win. Similar displays might also be present on adjacent consoles with messages advising of the winning console.

When the award is the result of a random event with the user interface, the character will morph into a new form such as a cash register or money bag and distribute the random prize.

If the award mode is as a result of a combination which was just missed, the character will morph into a form such as a strong man and push the symbols to form winning combination or perhaps a magician will appear and wave his wand.

Award mode may also start a series of bonus games as the result of a random event, in which case the character may morph into a bell ringer, a hammer which walks over and strikes a bell or the character may become a bell 95 and ring itself.

Once the award is completed, the state machine will again return to the Amorphous mode 80.

When in Promotional mode 85, the character will morph into a form suitable for the message being delivered. If play is slow the character may acquire binoculars and examine a score board indicating that progressive jackpot is imminent. If the player is playing single credit or single line bets, the character may pull out a book of statistics to advise on betting strategies that will enhance the players chances of winning etc.

Once a single promotional message has been given, the state machine will undergo a transition to Amorphous mode 80.

Attendant mode 84 is provided to enable the gathering of accounting and audit information. This mode is only entered when an attendant enters a special code or uses a special key.

In one particularly preferred embodiment, a generic character, most likely a coin with glasses, top hat, legs and arms will be used for the character that we will refer to as Mr. Cashman across all games. Standard games will use the Mr. Cashman character to give out bonus prizes in addition to all game and feature pays for the standard games. The precise functionality of the Mr. Cashman character may vary from one standard game to another, and will sometimes be the same for more than one standard game. (E.g. there may be 5 different Mr. Cashman functions per game where 3 are the same for each of the games but 2 are game-specific).

The functionality of the Mr. Cashman character will be similar to standard game features but with two important differences. Firstly the fact that the character is common between completely different games, secondly the fact that the trigger for the Mr. Cashman feature is in most, if not all cases, completely independent of the base game combinations. That is, the Mr. Cashman trigger is random and weighted by the desired hit rate of the feature. It is dependent upon the player's bet, and may or may not be dependent upon the size or type of the player's bet. For example, if a specific Mr. Cashman feature is required to initiate on average every 200 games played, then for every time the player initiates a game by pressing a bet button a random number will be selected in the range 1 to 200. If the number 1 is selected then the Mr. Cashman feature will be triggered. In some cases the chance of getting the Mr. Cashman feature will be dependent upon the number of lines played. For example, if for a single line bet the Mr. Cashman feature is required on average every 1000 games, then ideally the range from which random numbers are selected would be 1 to (1000/lines played). Realistically, the way this would be implemented in software will be where a random number in the range 1 to 1000 will be selected, and if the resulting number that was selected is in the range of from 1 to the number of lines played then the Mr. Cashman feature will be triggered.

Each different type of Mr. Cashman feature available in one standard game will have an independent, pre-determined probability of being triggered for each game played. In one particularly preferred embodiment, there are 5 separate random selections which are made whenever a player makes a bet on game. Any number from 0 to 5 of the selections may result in a successful Mr. Cashman feature trigger.

Preferably, when a Mr. Cashman feature is triggered it will not commence until after the completion of the entire game that triggered the Mr. Cashman feature. It will then commence before the player has been given the opportunity to bet on another game.

In cases where more than one of the different Mr. Cashman features are triggered from the same bet, they will commence one at a time such that as one completes the next one will commence. All of the triggered Mr. Cashman features will complete before the player is given the opportunity to bet on another game.

In one preferred embodiment, the Mr. Cashman features to be used will be as follows (the standard games used will be spinning reel games):

1) The Mr. Cashman character randomly spins one or more of the reels. These will be spun in random order. Different possibilities for the animations include Mr. Cashman kicking the reels, tapping them with his walking stick, pushing them, leaning on them, throwing something at them and so on. After the reels stop spinning, the player will be paid any wins that result from the new combination. Mathematically this feature is identical to awarding a single free game except that no specific combination is required to trigger it.
2) "The Money or the Box" feature. This will be a second-screen feature where the Mr. Cashman character will be holding (say) a bag of coins and a wad of dollar bills. The player will be asked to choose one or the other. If the bag is chosen, a number of free games and a multiplier to be applied to all wins during those free games will be revealed from the bag. If the wad of bills is chosen, a variable prize will be determined from a range of possible prizes and will be revealed from the bills.
3) The Mr. Cashman character randomly awarding the game-specific feature. For example, the standard game may include a feature where 3 X scatter symbols result in the commencement of a series of 15 free games with all wins tripled. The difference here will be that Mr. Cashman will enter and award the feature to the player without the need for the 3× scatter combination that is normally the pre-requisite for the commencement of the feature.
4) Occasionally, the Mr. Cashman character will enter the game screen and just give a variable random bonus prize. Visually, the prize may be displayed in a number of ways such as Mr. Cashman kicking the win meter, throwing coins at the win meter, pulling the win out of his hat, picking up a digit and carrying it over to add in front of the win meter or similar.
5) The Mr. Cashman character will sometimes enter the game screen, commence all of the reels spinning, and then while they are spinning will climb into the foreground of one of the spinning reels. The visual effect will be that the reel is spinning behind the fixed image of the Mr. Cashman character. When the reels stop spinning, the Mr. Cashman image in the foreground of one of the reels will be treated as a wild symbol such that Mr. Cashman substitutes for all symbols on that reel.

In a further embodiment of the invention, the character, Mr. Cashman acts as a busker. Players will actually be able to make donations to Mr. Cashman in order to watch him busk. 100% of the money that the gaming machine receives for Mr. Cashman's busking will be paid back to the player in bonus wins during the main game.

The preferred embodiment is for Mr. Cashman to appear on the screen when the machine is in zero credit mode. He will probably be holding a musical instrument with his hat out in front of him (i.e. in a typical pose for a busker). If a coin is inserted, the player will be given a choice of whether to play the game or watch Mr. Cashman busk. If the choice is to watch him busk he will perform for the player's money along with a special tune. The coin that was inserted will be added into a bonus pool by the gaming machine software.

During the main game, the Mr. Cashman features previously described will apply. When some of the features are triggered (e.g. random bonus), a random decision will be made as to whether the contents of the bonus pool (or a subset of the bonus pool) will be awarded in addition to any win from that feature. The software will always keep a running tally of the contents of the bonus pool.

Referring to FIGS. 18-27, these provide examples of the features generally described above, which can be included in embodiments of the invention.

FIG. 18 depicts a character 150 which will be referred to as Mr. Cashman, which is a character used in the following particularly preferred embodiments of the invention.

Turning to FIG. 19, 4 snapshots are illustrated from a sequence where Mr. Cashman 150 walks from screen to screen across the top box screens 151 of a bank of 3 linked gaming consoles. This function demonstrates to players on this bank of machines that Mr. Cashman is active and that the functions and features associated with the character are available to the players. In FIG. 19*a*, Mr. Cashman is seen entering the right hand edge of the screen of the right hand console. He is then seen in FIG. 19*b*) progressing through the left hand edge of the screen of the right hand console. Subsequently, in FIGS. 19(*c*) & 19(*d*), Mr. Cashman progresses towards and across the left hand console and will alternately move off of the display of the left hand console and onward across other screens in the bank of consoles.

Figure 20A:
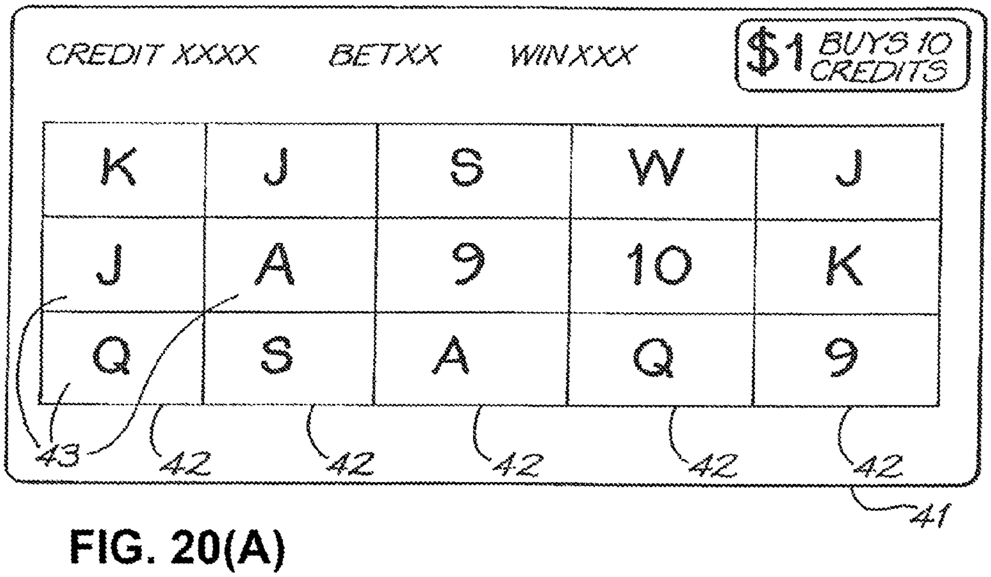
FIGS. 20A-20C illustrate a feature where the character of FIG. 18 randomly spins a reel.
Figure 20B:
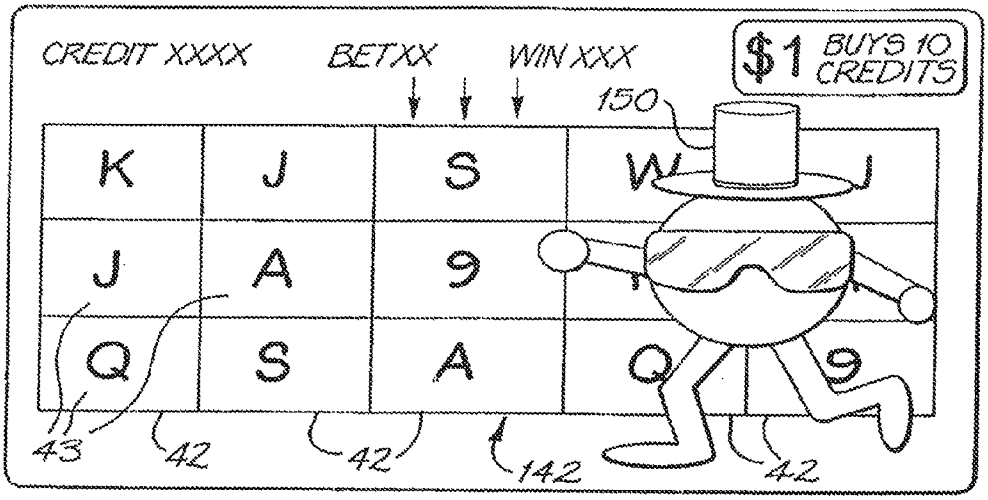
Figure 20C:
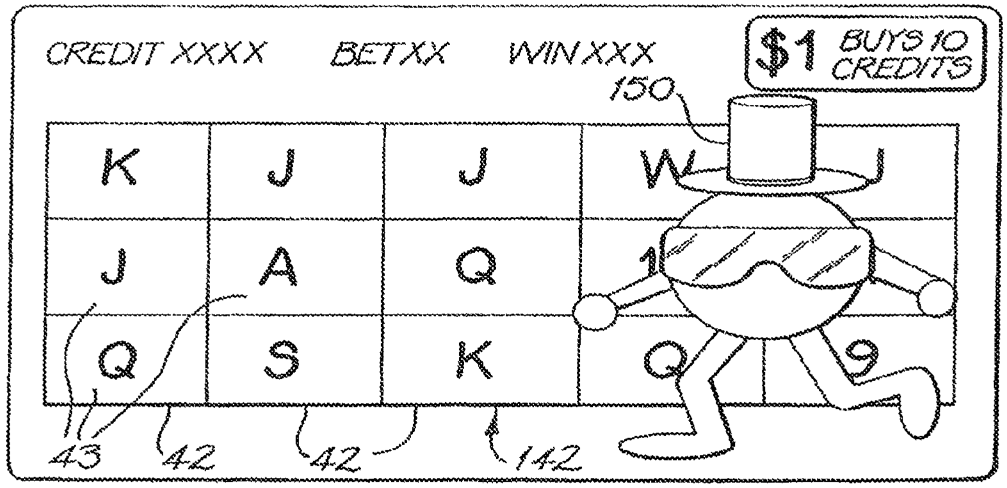

In FIG. 20, a feature is illustrated where Mr. Cashman 150 randomly spins one reel 42 of the reels 42. That is:

a) A spinning reel game will run to completion as illustrated in FIG. 20(*a*), (i.e. applicable wins are paid); and then b) Mr. Cashman 150 enters the screen 41 and spins the third reel 142 as shown in FIG. 20(*b*); and c) A new game outcome is displayed as illustrated in FIG. 20(*c*), (and any wins from the resulting combination are paid).

Figure 21:
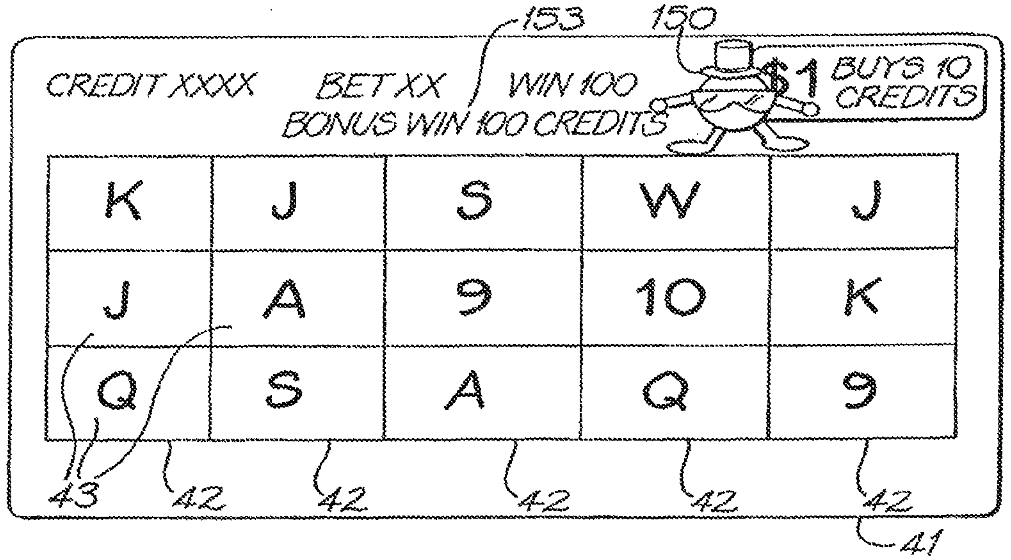
FIG. 21 illustrates a random bonus feature, where the character of FIG. 18 appears above the reels and gives a fixed or variable bonus prize.

A random bonus feature is illustrated in FIG. 21, where Mr. Cashman 150 appears above the reels and gives a fixed or variable bonus prize 153 as a result of a random trigger.

Figure 22A:
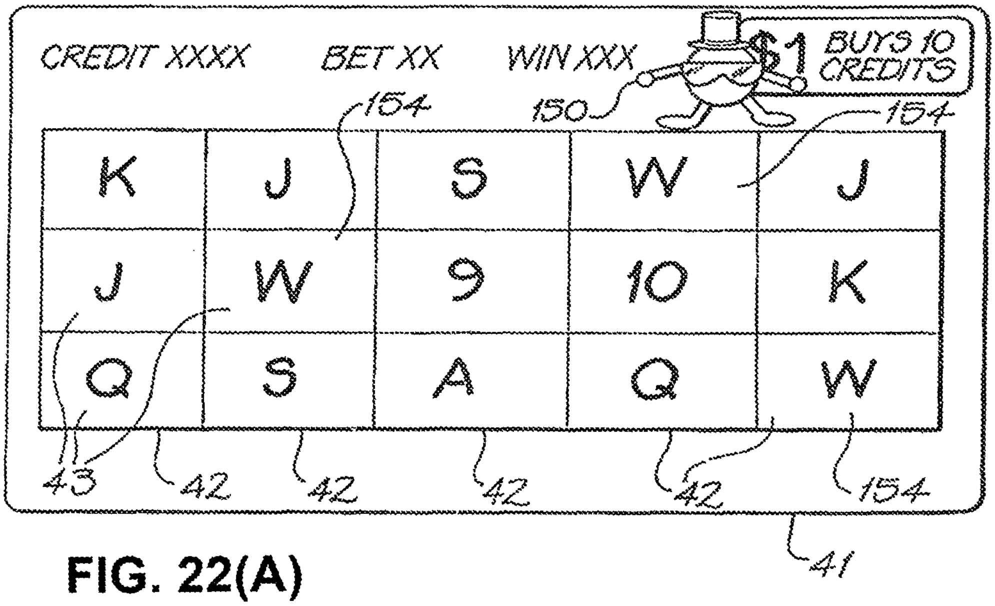
FIGS. 22A-22C illustrate a bonus game feature where the character of FIG. 18 enters the reel strips.
Figure 22B:
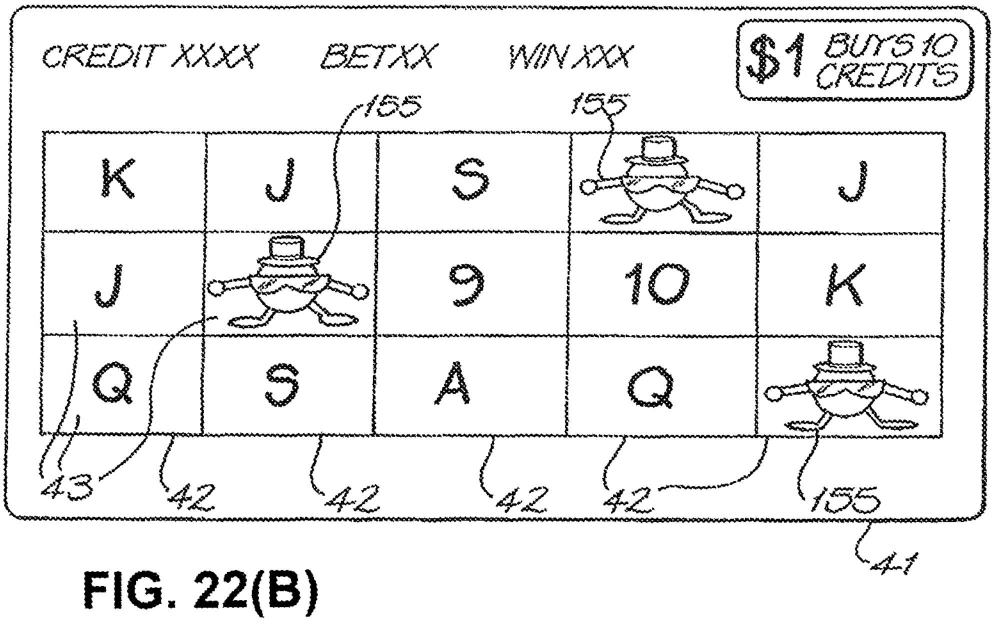
Figure 22C:
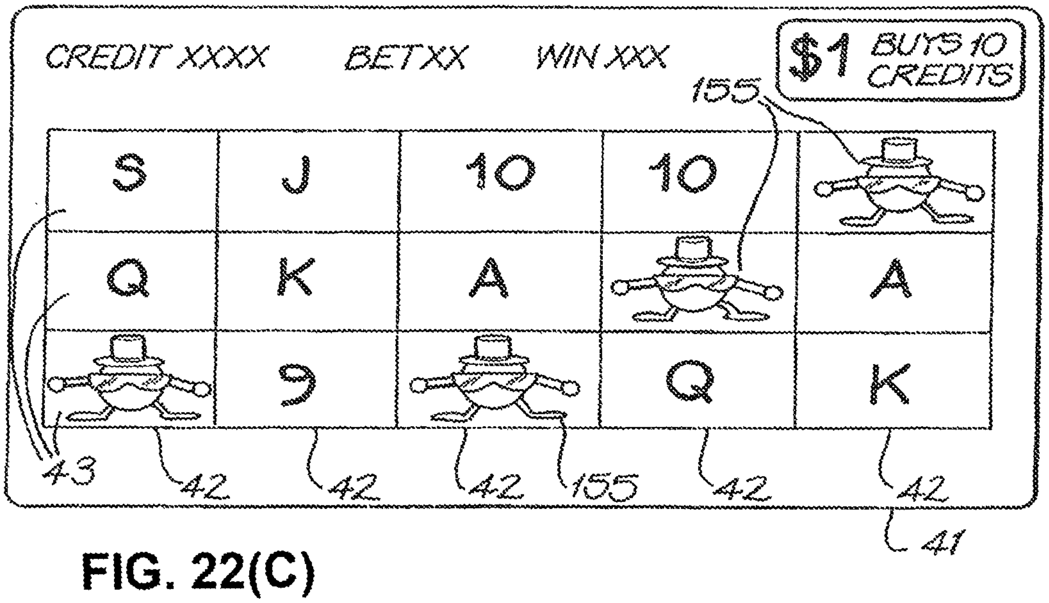

Another bonus game feature is illustrated in FIG. 22 in which Mr. Cashman 150 enters the reel strips 42. That is:

a) Mr. Cashman 150 randomly appears above the reels after a game is completed;

b) Mr. Cashman jumps onto the reel strips 42 resulting in all of a specific type of symbol 154 (for example, substitutes, scatters, any picture symbols) being replaced by the Mr. Cashman character 155; and c) A fixed or variable number of free or paid games occur with the Mr. Cashman symbol staying in the same positions on the reel strip. There may be a special paytable for Mr. Cashman pays or the character may be a substitute symbol that multiplies wins or similar.

Figure 23A:
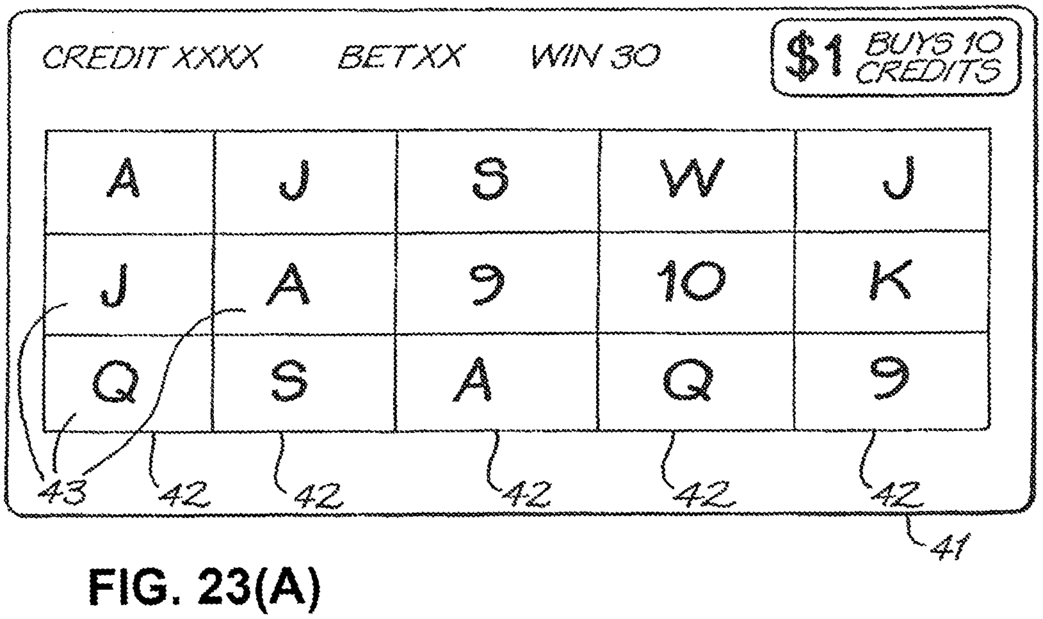
FIGS. 23A-23C illustrate the character of FIG. 18 manipulating the win meter.
Figure 23B:
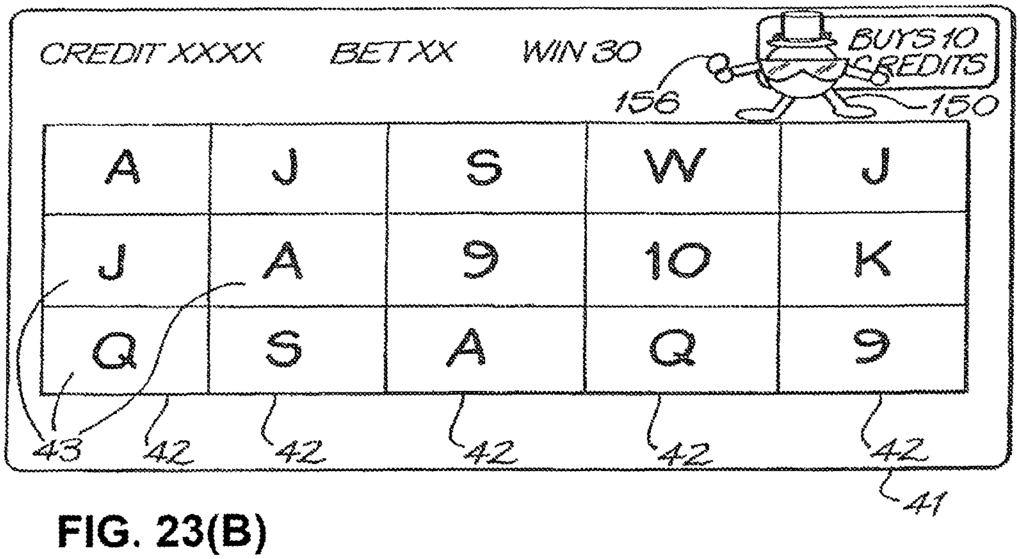
Figure 23C:
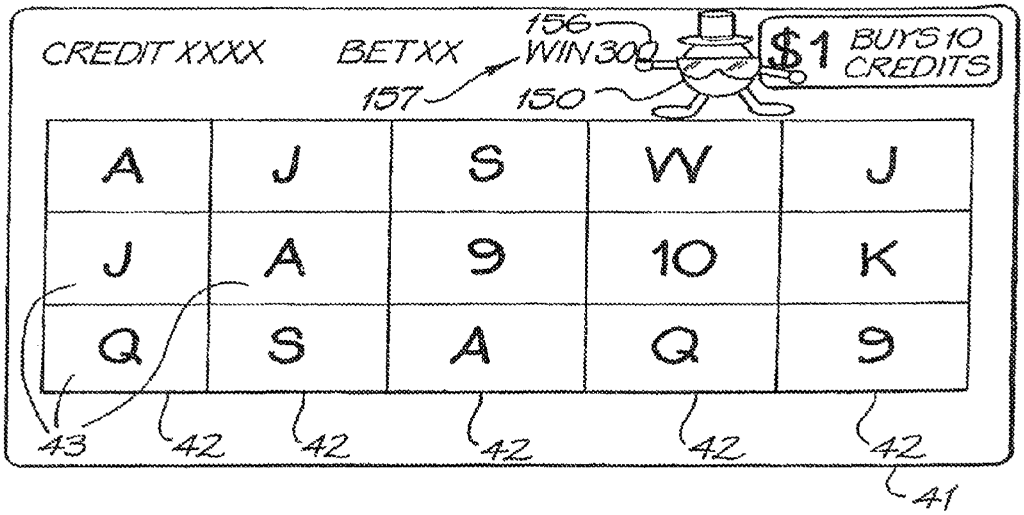
Figure 24A:
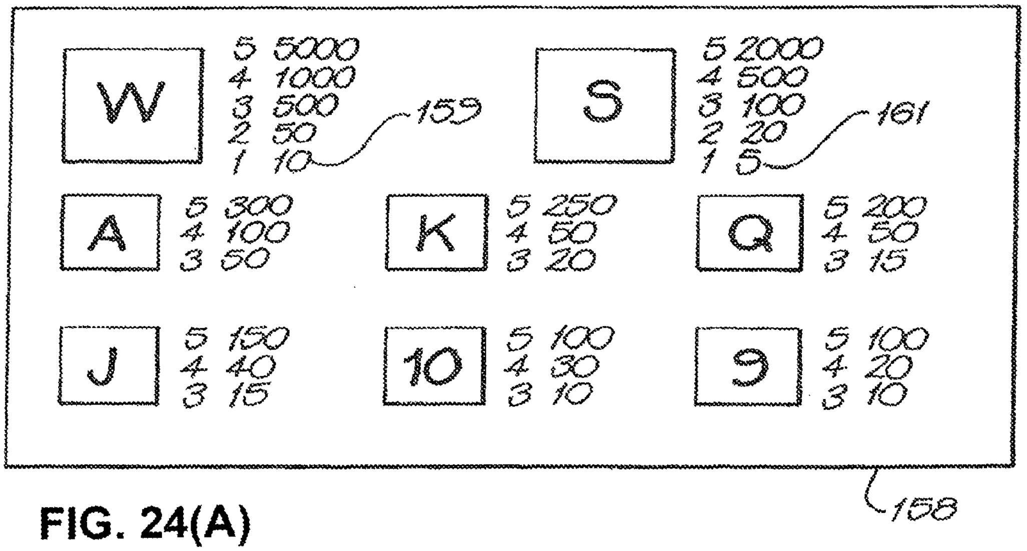
FIGS. 24A-24C illustrate the character of FIG. 18 manipulating the paytable.
Figure 24B:
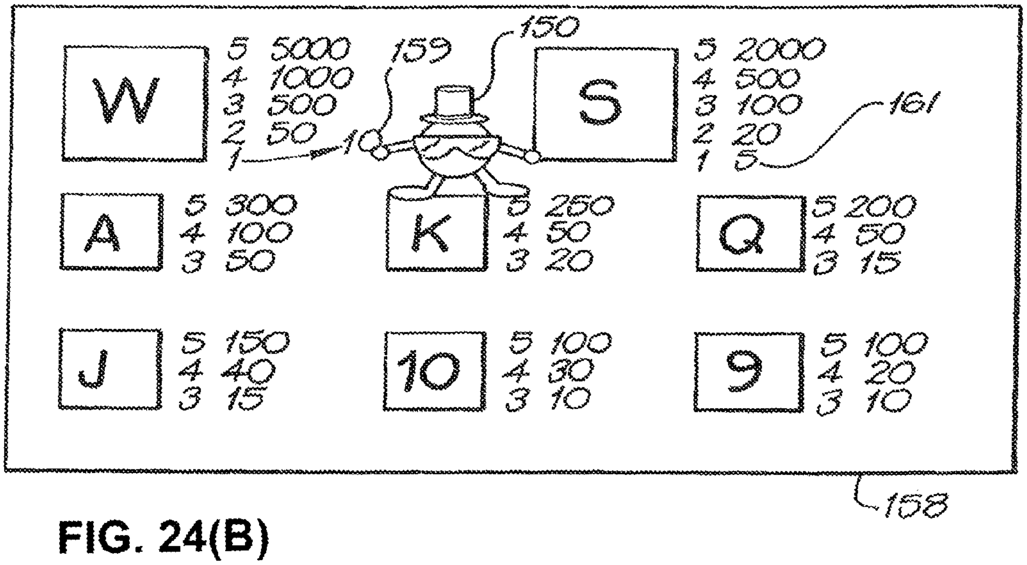
Figure 24C:
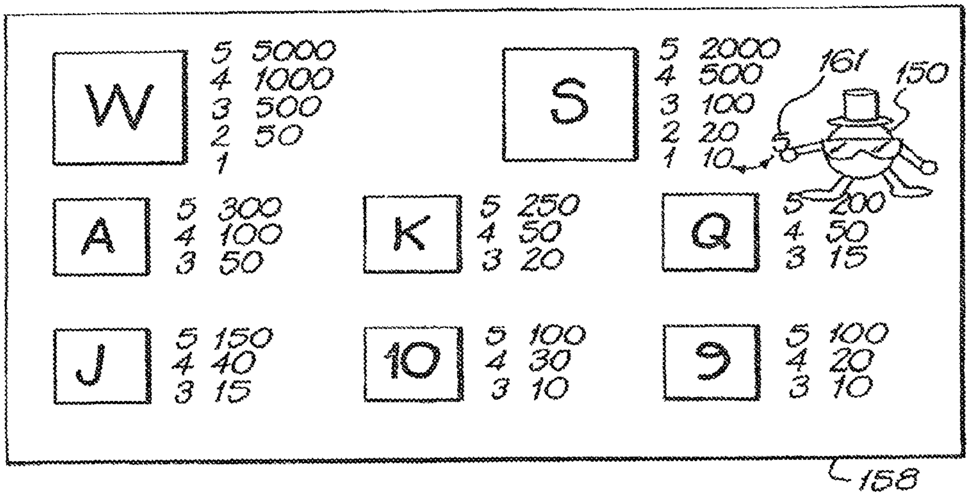

Mr. Cashman may also manipulate the win meter as illustrated in FIG. 23. In this example:

a) A spinning reel game is completed and a standard win is paid (i.e. 30 credits for 3 Aces on line 4);

b) Mr. Cashman 150 carries an extra digit 156 across the screen (i.e. a 0); and c) Mr. Cashman places the extra digit 156 onto the win meter 157 to result in a new win value (i.e. the 0 on the end of the meter results in 30 becoming 300).

Mr. Cashman 150 is seen manipulating the paytable in the FIG. 24 embodiment. For this example:

a) There is a standard scorecard 158;

b) Mr. Cashman 150 randomly enters the scorecard 158 and picks up one of the prizes 159; and c) Mr. Cashman swaps the prize 159 with another prize 161 on the scorecard.

Figure 25A:
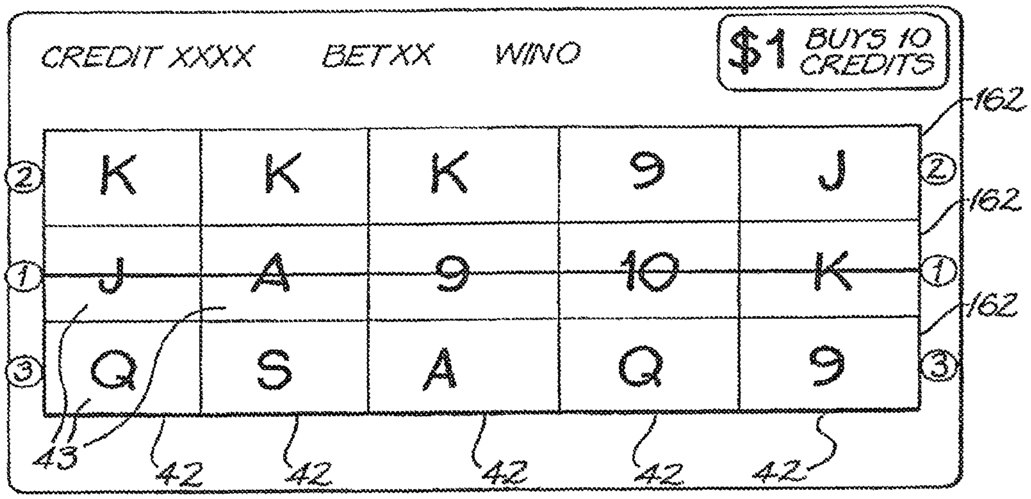
FIGS. 25A-25B illustrate the character of FIG. 18 offering informative/encouraging statements.
Figure 25B:
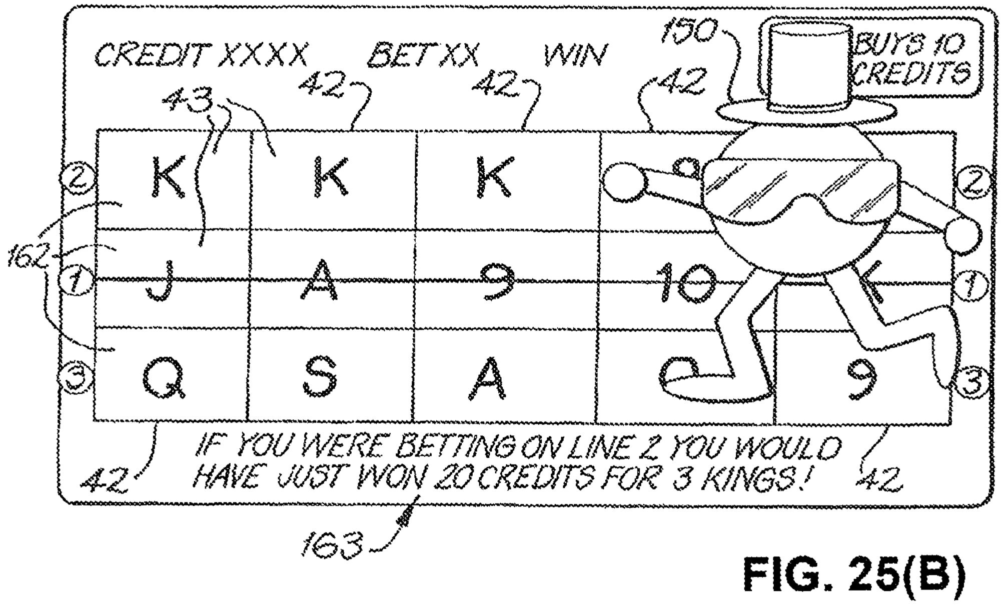

Mr. Cashman 150 can also provide information to a player or encourage the player under certain circumstances. In FIG. 25, Mr. Cashman is seen in a situation where:

a) A player bets on less than the maximum number of paylines 162. In this case 1 payline out of a possible 3; and b) A combination is spun up (i.e., on the upper line (2)) that would have resulted in a win if the player had been betting on all of the lines. Mr. Cashman informs the player of this situation with a message 163 at the bottom of the screen.

Figure 26:
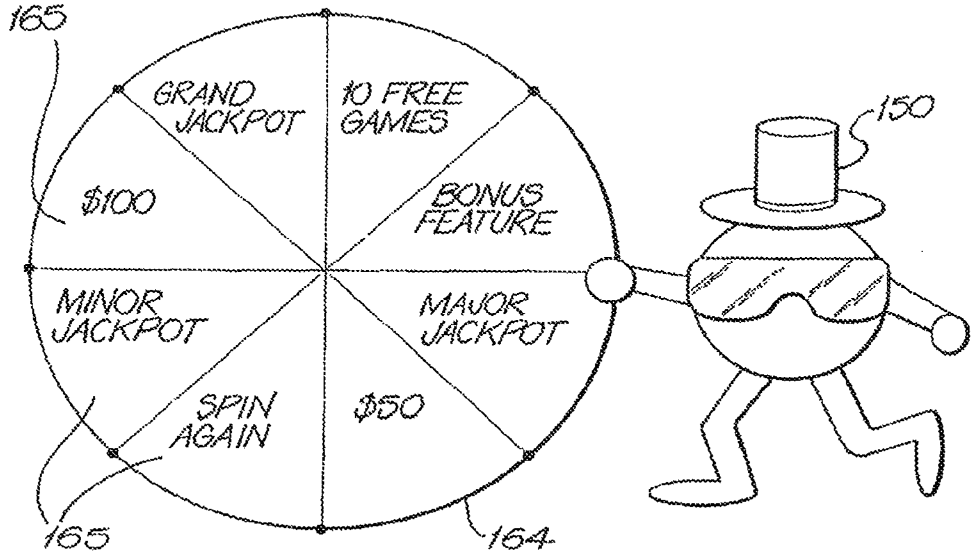
FIG. 26 illustrates the character of FIG. 18 providing a second screen bonus feature.

A Mr. Cashman second screen bonus feature is illustrated in FIG. 26. In this embodiment, a random trigger results in the second screen chocolate wheel 164 appearing, Mr. Cashman 150 spins the wheel to determine which of a plurality of possible outcomes 165 will be awarded to the player.

Referring to FIG. 27, this diagram shows 3 different features combined, these being:

a) A losing streak bonus in which the gaming console recognizes that the current player has not had a win for an unusually large number of games and hence rewards the player with a Mr. Cashman bonus 165 in which Mr. Cashman 150 appears and announces the bonus;

b) Mr. Cashman 150 may randomly award the standard game feature applicable to the game being played without the normal trigger condition being necessary. For example a game may have a series of 10 free games triggered by the occurrence of 3 scatter symbols, but Mr. Cashman may randomly award the free game feature without the 3 scatters being necessary in which case he again appears and awards the feature 165; and c) Mr. Cashman's messages could be displayed by way of a speech bubble 166 rather than a message line.

A further feature which is referred to as the Mr. Cashman "money or the box" feature is illustrated in FIG. 28. When the features is randomly triggered:

a) Mr. Cashman 150 appears and makes an offer 169 to the player of a choice between 2 items such as the money bag 167 and the wad of cash 168 seen in FIG. 28(*a*);

b) If the player chooses one item such as the money bag as illustrated in FIG. 28(*b*), it results in a variable win of a secondary feature 171, such as the 20 free games illustrated; or c) If on the other hand, the player chooses the other item such as the wad of cash as illustrated in FIG. 28(*c*), it results in a variable prize 172 being awarded straight to the win meter 173.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A wagering gaming machine configured to play a base game and a first supplemental game, the wagering game machine being communicatively coupled to a second wagering game machine, the second wagering game machine configured to play a second supplemental game, the wagering game machine comprising:

a display device;

a random number generator;

an accepting device configured to accept a physical item associated with a monetary value, the monetary value establishing a credit balance, the credit balance being increasable and decreasable based at least on wagering activity;

a payout device configured to receive an input to cause an initiation of a payout associated with the credit balance;

a non-transitory memory device having computer-executable instructions and data indicative of a character and a plurality of images stored thereon; and a game controller, which upon executing the computer-executable instructions, is configured to:

receive a wager amount placed for play of the base game, the wager amount decreasing the credit balance;

control the images to be displayed on the display device for play of the base game and play of the first supplemental game;

cause at least one random triggering event to occur, via the random number generator, in the base game to be displayed on the display device;

if at least one predefined winning event occurs in the base game, award a prize value, the prize value increasing the credit balance;

detect the occurrence of the at least one random triggering event;

in response to detecting the occurrence of the at least one random triggering event, generate an appearance of a character, via the data stored in the non-transitory memory device, on the display device of the wagering game machine for play of the first supplemental game and on a second display device associated with the second wagering game machine for play of the second supplemental game;

detect the input to cause the initiation of the payout, via the payout device;

wherein the first supplemental game is different from the base game;

wherein the first supplemental game is different from the second supplemental game; and wherein the random triggering event is based on an amount of the wager placed for play of the base game.

2. The wagering gaming machine of claim 1, wherein the first and second supplemental games are independent of an outcome of the base game.

3. The wagering gaming machine of claim 1, wherein at least one of the first and second supplemental games commences after a completion of the base game.

4. The wagering gaming machine of claim 3, wherein at least one of the first and second supplemental games commences before a bet is placed on another game.

5. The wagering gaming machine of claim 1, wherein the first and second supplemental games commence one at a time.

6. The wagering gaming machine of claim 1, wherein the base game on the wagering gaming machine is a video simulation of a spinning reel game and one of the first and second supplemental games is an animated spinning reel bonus game in which one or more of a plurality of simulated reels, each carrying a plurality of symbols, are caused to randomly spin and stop, and if a predetermined combination of symbols is displayed a prize associated with the combination is awarded.

7. The wagering gaming machine of claim 6, wherein the game controller is further configured to activate the character to spin each of the reels.

8. The wagering gaming machine of claim 7, wherein, during at least one of the first and second supplemental games, while the reels are spinning, the character is further configured to treat one of the reels as a bonus reel and when the reels stop spinning, the character is further configured to treat the bonus reel as having stopped on a wild symbol which substitutes for all symbols on the bonus reel.

9. The wagering gaming machine of claim 8, wherein the character is further configured to climb the bonus reel.

10. The wagering gaming machine of claim 1, wherein the base game provided on the wagering gaming machine is a video simulation of a spinning reel game and wherein the character is configured to offer a selection between a plurality of options, each of the options is associated with at least one of a hidden prize and a bonus game during one of the first and second supplemental games.

11. The wagering gaming machine of claim 10, wherein at least one of the first and second supplemental games comprises the character holding and offering a choice between a plurality of objects.

12. The wagering gaming machine of claim 11, wherein the objects include a money representation and a box representation.

13. The wagering gaming machine of claim 12, wherein the game controller is further configured to prompt for a choice between the money representation and the box representation.

14. The wagering gaming machine of claim 11, wherein, after one of the objects is chosen, the game controller is further configured to reveal that a number of free games on the wagering gaming machine has been awarded, and to apply a multiplier to all prizes won during those free games.

15. The wagering gaming machine of claim 11, wherein after one of the object is chosen, the game controller is further configured to determine a variable prize from a range of possible prizes.

16. The wagering gaming machine of claim 1, wherein the base game provided on the wagering gaming machine is a video simulations of a spinning reel game and wherein the character is configured to randomly award one of the first and second supplemental games, wherein at least one of the first and second supplemental games is specific to the base game.

17. The wagering gaming machine of claim 1, wherein the base game provided on the wagering gaming machine is a video simulations of a spinning reel game and wherein the character is configured to appear intermittently and randomly the base game, and to award a variable random bonus prize in at least one of the first and second supplemental games.

18. The wagering gaming machine of claim 1, wherein the character is configured to deliver visual messages in the form of symbols and/or text.

19. The wagering gaming machine of claim 1, wherein the triggering event comprises at least one of:

a. a periodic trigger;

b. a random trigger;

c. an occurrence of an external trigger event;

d. an occurrence of one or more specific game states;

e. an occurrence of one or more specific wagering gaming machine states.

20. The wagering gaming machine of claim 1, wherein the triggering event comprises at least one of:

(a) an occurrence of a game state wherein a decision is made to position the character to offer advice on probabilities of various possible outcomes;

(b) an offering of bonus prizes as incentives after long non-winning stretches have been determined;

(c) an offering of game specific bonus features after a long stretch where the game specific bonus feature has not been awarded;

(d) an announcement of a bonus game or a series of games awarded to the player;

(e) an announcement of winning of a mystery jackpot, either on the wagering gaming machine, or a adjacent wagering gaming machine;

(f) wins in “near-miss” situations by “nudging” a symbol into a winning position;

(g) an ordering of a taxi after the base game has been active for a long period or when erratic game play behavior has been detected;

(h) a periodical offering of a drink or food;

(i) a periodical provision of public service information and information on services, facilities and entertainment programs offered;

(j) an offering of an advice when the wagering gaming machine had detected a fault condition in which case the character explains the fault.

21. The wagering gaming machine of claim 1, wherein said wagering gaming machine and said different wagering gaming machine are in a bank of wagering gaming machines, and wherein the character is configured to appear on the bank of wagering gaming machines in a coordinated manner.

22. The wagering gaming machine of claim 21, wherein the character is configured to appear simultaneously on all of the wagering gaming machines in the bank.

23. The wagering gaming machine of claim 21, wherein the character is configured to appear only on one of the wagering gaming machines in the bank at any one time.

24. The wagering gaming machine of claim 21, wherein the character is configured to be animated to walk from one wagering gaming machine to an adjacent wagering gaming machine, disappearing from a display of said one wagering gaming machine as the character appears on a different display of said adjacent wagering gaming machine.

25. The wagering gaming machine of claim 21, wherein, when a jackpot is won, the character is further configured to announce the winning of the jackpot to adjacent wagering gaming machines.

26. The wagering gaming machine of claim 21, wherein the wagering gaming machine is a first wagering gaming machine, when the character appears on one of the wagering gaming machines to award a bonus, the character is further configured to announce simultaneously a presence of the bonus award other wagering gaming machines in the bank of wagering gaming machines.

27. The wagering gaming machine of claim 1, wherein, the character is further configured to initiate a tournament when the wagering gaming machine is eligible for the tournament, and to provide instructions.

* * * * *